US012182931B2

(12) United States Patent
Hundal et al.

(10) Patent No.: US 12,182,931 B2
(45) Date of Patent: Dec. 31, 2024

(54) SYSTEM AND METHOD FOR RENDERING CLOTHING ON A TWO-DIMENSIONAL IMAGE

(71) Applicant: Snap 'N Fit, LLC, Wilmington, DE (US)

(72) Inventors: Hein Hundal, Port Matilda, PA (US); Rob Reitzen, Los Angeles, CA (US); Larissa Posner, New York, NY (US); Andrew Raffensperger, New Holland, PA (US)

(*) Notice: Subject to any disclaimer, the term of this patent is extended or adjusted under 35 U.S.C. 154(b) by 208 days.

(21) Appl. No.: 17/649,758

(22) Filed: Feb. 2, 2022

(65) Prior Publication Data

US 2022/0222887 A1 Jul. 14, 2022

Related U.S. Application Data

(63) Continuation-in-part of application No. 17/575,277, filed on Jan. 13, 2022, now abandoned.
(Continued)

(51) Int. Cl.
| | |
|---|---|
| *G06T 15/20* | (2011.01) |
| *G06T 7/13* | (2017.01) |
| *G06T 11/60* | (2006.01) |
| *G06T 15/50* | (2011.01) |
| *G06T 17/20* | (2006.01) |
| *G06T 19/00* | (2011.01) |

(52) U.S. Cl.
CPC ............. *G06T 15/205* (2013.01); *G06T 7/13* (2017.01); *G06T 11/60* (2013.01); *G06T 15/506* (2013.01); *G06T 17/205* (2013.01); *G06T 19/00* (2013.01); *G06T 2207/30124* (2013.01); *G06T 2207/30196* (2013.01)

(58) Field of Classification Search
CPC ........... G06T 19/00; G06T 2207/30124; G06T 2207/30196; G06Q 30/0621; G06Q 30/0643
See application file for complete search history.

(56) References Cited

U.S. PATENT DOCUMENTS

| | | | |
|---|---|---|---|
| 11,429,991 B1 * | 8/2022 | Tran ...................... | G06Q 10/087 |
| 2005/0081161 A1 * | 4/2005 | MacInnes .............. | G06Q 30/01 |
| | | | 715/848 |

(Continued)

*Primary Examiner* — Jayanti K Patel
*Assistant Examiner* — Christopher Kingsbury Glover
(74) *Attorney, Agent, or Firm* — Bradley Arant Boult Cummings, LLP; Blake M. Bernard

(57) ABSTRACT

A system is disclosed for rending clothing on a two-dimensional image. The system may include a processor or a computer-readable storage medium storing executable instructions thereon. In response to the processor executing the executable instructions, the processor may be configured to receive at least one depth frame of a photography subject. The processor can generate a virtual avatar based on the at least one depth frame, wherein the virtual avatar may include a digital three-dimensional mesh. The processor can receive a digital three-dimensional model of an article of clothing. The processor can manipulate the digital three-dimensional model of the article of clothing to fit on the virtual avatar, render the digital three-dimensional model of the article of clothing into a two-dimensional image, or overlay the two-dimensional image onto a two-dimensional version of the at least one depth frame.

18 Claims, 21 Drawing Sheets

Related U.S. Application Data

(60) Provisional application No. 63/144,559, filed on Feb. 2, 2021, provisional application No. 63/136,899, filed on Jan. 13, 2021.

(56) References Cited

U.S. PATENT DOCUMENTS

| | | | |
|---|---|---|---|
| 2018/0047192 A1* | 2/2018 | Kristal | G06Q 30/0643 |
| 2019/0311488 A1* | 10/2019 | Sareen | G06T 7/60 |
| 2021/0090209 A1* | 3/2021 | Appleboim | G06Q 30/0631 |

* cited by examiner

500

| Time | Master | Secondary |
|---|---|---|
| 0 ms | 4:00:00.000 | 4:00:00.347 |
| 100 ms | 4:00:00.100 | 4:00:00.447 |
| 197 ms | 4:00:00.197 | 4:00:00.544 |

502 → Time
504 → Master
506 → Secondary

SYSTEM AND METHOD FOR RENDERING CLOTHING ON A TWO-DIMENSIONAL IMAGE

CROSS-REFERENCES TO RELATED APPLICATIONS

This nonprovisional patent application claims priority to U.S. Provisional Patent Application No. 63/144,559, entitled "SYSTEM AND METHOD FOR RENDERING CLOTHING ON A TWO DIMENSIONAL IMAGE," filed Feb. 2, 2021. This nonprovisional patent application is also a continuation-in-part of U.S. patent application Ser. No. 17/575,277, entitled "SYSTEMS AND METHODS FOR CAPTURING A THREE-DIMENSIONAL IMAGE," filed on Jan. 13, 2022; which claims priority to U.S. Provisional Patent Application No. 63/136,899, entitled "Systems and Methods for Capturing a Three-dimensional Image," filed on Jan. 13, 2021. The entirety of these applications is incorporated by reference.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

BACKGROUND OF THE INVENTION

The present disclosure relates generally to three-dimensional imagery and more particularly relates to a systems and method for rendering clothing on a two-dimensional image.

One conventional system of generating three-dimensional imagery includes a single, depth-calculating camera moving to multiple positions around the photography subject, the camera capturing one or more images at each position, and later compiling the multiple captured images into one three-dimensional image. However, in such a system, the photography subject cannot move or else the multiple captured images will not compile correctly. A second conventional system of generating three-dimensional images includes positioning multiple non-depth-calculating cameras around the photography subject, capturing two-dimensional images with the multiple cameras, and compiling the captured images into the three-dimensional image. However, the positions of the cameras in relation to the photography subject must be known or estimated. The positions can only be estimated up to a scalar factor with ordinary two-dimensional images unless a calibration object is captured in one of the images.

Additionally, when a customer is browsing a clothing inventory on a retailer's website, the customer may desire to see what the clothing would look like on the customer's own body. However, retailer websites often only have static, two-dimensional pictures of the article of clothing. Thus, the article of clothing is usually not oriented in a position or sized to be superimposed on an image of the customer. Similar difficulties are encountered when attempting to render other types of articles on other types of items. For example, a customer may desire to see what an item of furniture looks like with different upholsteries applied to the furniture.

Thus, what is needed are improvements to a system and method for rending clothing on a two-dimensional image.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the disclosure is a method. The method may include positioning a plurality of devices around a calibration subject. The plurality of devices may include a master device and at least one secondary device. The method may include calculating, for each secondary device of the at least one secondary devices, a time offset between the master device and the secondary device. The method may include capturing, on each device of the plurality of devices, a first three-dimensional depth frame of the calibration subject. The plurality of devices may capture the first three-dimensional depth frames simultaneously based on the time offsets. The method may include calculating a plurality of depths based on the first three-dimensional depth frames. The method may include capturing, on each device of the plurality of devices, a second three-dimensional depth frame of a photography subject. The plurality of devices may capture the second three-dimensional depth frames simultaneously based on the time offsets. The method may include assembling, based on the second three-dimensional depth frames, a three-dimensional data representation of the photography subject.

Another aspect of the disclosure is an apparatus. The apparatus may include a camera. The apparatus may include a processor. The apparatus may include a computer-readable storage medium storing a software application thereon. In response to the processor executing the software application, the apparatus may be configured to send a timestamp request to a second apparatus at a first time; receive a response from the second apparatus, the response including a second time, and the response arriving at the apparatus at a third time; calculate a time offset based on the first time, the second time, or the third time; send a capture request to the second apparatus, the capture request including a command for the second apparatus to capture a first three-dimensional depth frame using the camera of the second device at a fourth time that accounts for the time offset; and capture, at the same time as the capturing of the first three-dimensional depth frame by the second device, a second three-dimensional depth frame using the camera of the device.

Another aspect of the disclosure may include a system. The system may include a plurality of devices. The plurality of devices may include a master device and one or more secondary devices. The system may include a calibration subject and a photography subject. The system may include a computing device. The master device may be operable to calculate, for each of the one or more secondary devices, a time offset between the master device and the secondary device. The master device and the one or more secondary devices may each be operable to simultaneously capture a first three-dimensional depth frame of the calibration subject at a first time. The first time may be based on the time offsets. The master device and the one or more secondary devices may each be operable to simultaneously capture a second three-dimensional depth frame of the photography subject at a second time. The second time may be based on the time offsets. The computing device may be operable to assemble, based on the second three-dimensional depth frames, a three-dimensional data representation of the photography subject.

Another aspect of the disclosure may include a system for rending clothing on a two-dimensional image. The system may include a processor or a computer-readable storage medium storing executable instructions thereon. In response to the processor executing the executable instructions, the processor may be configured to receive at least one depth frame of a photography subject; generate a virtual avatar based on the at least one depth frame, wherein the virtual avatar may include a digital three-dimensional mesh; receive a digital three-dimensional model of an article of clothing; manipulate the digital three-dimensional model of the article of clothing to fit on the virtual avatar; render the digital three-dimensional model of the article of clothing into a two-dimensional image; or overlay the two-dimensional image onto a two-dimensional version of the at least one depth frame.

Numerous other objects, advantages and features of the present disclosure will be readily apparent to those of skill in the art upon a review of the following drawings and description of the embodiments.

BRIEF DESCRIPTION OF THE DRAWINGS

FIG. 5 is a table illustrating clock times of the master device and the secondary device of FIG. 4.

DETAILED DESCRIPTION

Figure 1A:
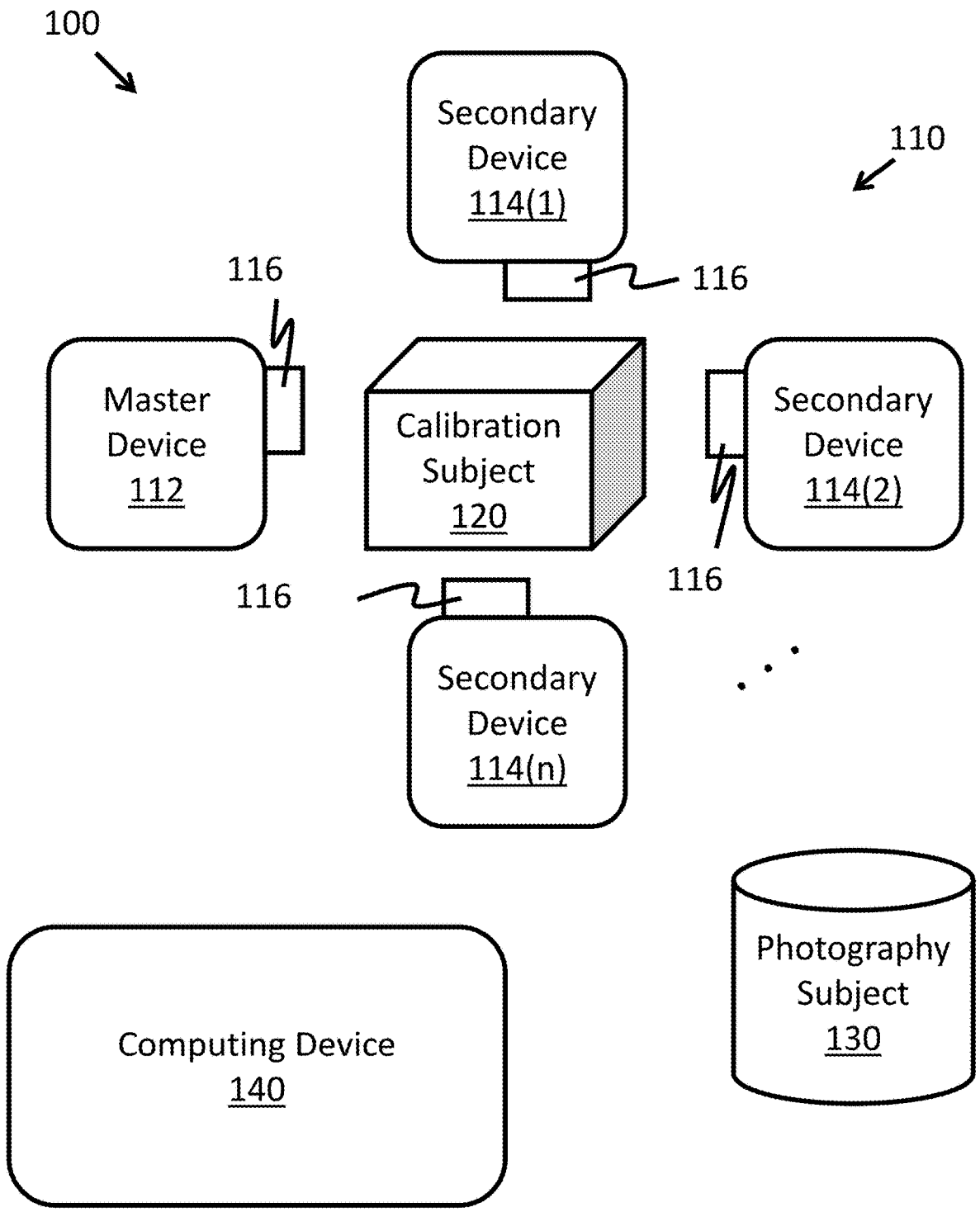
FIG. 1A is a schematic block diagram illustrating one embodiment of a system for capturing a three-dimensional image.

While the makings and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

In the drawings, not all reference numbers are included in each drawing, for the sake of clarity. In addition, positional terms such as "upper," "lower," "side," "top," "bottom," etc. refer to the apparatus when in the orientation shown in the drawing. A person of skill in the art will recognize that the apparatus can assume different orientations when in use.

Reference throughout this specification to "one embodiment," "an embodiment," "another embodiment," or similar language means that a particular feature, structure, or characteristic described in connection with the embodiment is included in at least one embodiment. Thus, appearances of the phrases "in one embodiment," "in an embodiment," "in some embodiments," and similar language throughout this specification may, but do not necessarily, all refer to the same embodiment, but mean "one or more but not necessarily all embodiments" unless expressly specified otherwise.

The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. As used herein, the term "a," "an," or "the" means "one or more" unless otherwise specified. The term "or" means "and/or" unless otherwise specified.

Multiple elements of the same or a similar type may be referred to as "Elements 102(1)-(*n*)" where n may include a number. Referring to one of the elements as "Element 102" refers to any single element of the Elements 102(1)-(*n*). Referring to an "Element 102(1)," "Element 102(2)", etc. refer to a specific Element 102 of the one or more Elements 102(1)-(*n*). Additionally, referring to different elements "First Elements 102(1)-(*n*)" and "Second Elements 104(1)-(*n*)" does not necessarily mean that there must be the same number of First Elements as Second Elements and is equivalent to "First Elements 102(1)-(*n*)" and "Second Elements (1)-(*m*)" where m is a number that may be the same or may be a different number than n.

As used herein, the term "computing device" may include a desktop computer, a laptop computer, a tablet computer, a mobile device such as a mobile phone or a smart phone, a smartwatch, a gaming console, an application server, a database server, or some other type of computing device. A computing device may include a physical computing device or may include a virtual machine (VM) executing on another computing device. A computing device may include a cloud computing system, a distributed computing system, or another type of multi-device system.

As used herein, the term "data network" may include a local area network (LAN), wide area network (WAN), the Internet, or some other network. A data network may include one or more routers, switches, repeaters, hubs, cables, or other data communication components. A data network may include a wired connection or a wireless connection.

As used herein, the terms "determine" or "determining" may include a variety of actions. For example, "determining" may include calculating, computing, processing, deriving, looking up (e.g., looking up in a table, a database or another data structure), ascertaining, or other actions. Also, "determining" may include receiving (e.g., receiving information or data), accessing (e.g., accessing data in a memory, data storage, distributed ledger, or over a network), or other actions. Also, "determining" may include resolving, selecting, choosing, establishing, or other similar actions.

As used herein, the terms "provide" or "providing" may include a variety of actions. For example, "providing" may include generating data, storing data in a location for later retrieval, transmitting data directly to a recipient, transmitting or storing a reference to data, or other actions. "Providing" may also include encoding, decoding, encrypting, decrypting, validating, verifying, or other actions.

As used herein, the term "access," "accessing", and other similar terms may include a variety of actions. For example, accessing data may include obtaining the data, examining the data, or retrieving the data. Providing access or providing data access may include providing confidentiality, integrity, or availability regarding the data.

As used herein, the term "message" may include one or more formats for communicating (e.g., transmitting or receiving) information or data. A message may include a machine-readable collection of information such as an Extensible Markup Language (XML) document, fixed-field message, comma-separated message, or another format. A message may, in some implementations, include a signal utilized to transmit one or more representations of information or data.

As used herein, the term "user interface" (also referred to as an interactive user interface, a graphical user interface or a UI), may refer to a computer-provided interface including data fields or other controls for receiving input signals or providing electronic information or for providing information to a user in response to received input signals. A user interface may be implemented, in whole or in part, using technologies such as hyper-text mark-up language (HTML), a programming language, web services, or rich site summary (RSS). In some implementations, a user interface may be included in a stand-alone client software application configured to communicate in accordance with one or more of the aspects described.

As used herein, the term "modify" or "modifying" may include several actions. For example, modifying data may include adding additional data or changing the already-existing data. As used herein, the term "obtain" or "obtaining" may also include several types of action. For example, obtaining data may include receiving data, generating data, designating data as a logical object, or other actions.

As used herein, the term "data object" may include a logical container for data. A data object may include an instance of an object in a software application implemented with an object-oriented programming language. A data object may include data formatted in an electronic data interchange (EDI) format, such as an eXtensible Markup Language (XML) object, a JavaScript Object Notation (JSON) object, or some other EDI-formatted object. A data object may include one or more functions that may manipulate the data of the data object. For example, a data object may include the functions or methods of an object in a software application implemented with an object-oriented programming language.

FIG. 1A depicts one embodiment of a system 100 for capturing three-dimensional photographs of a photography subject 130. The system 100 may include a plurality of devices 110. The plurality of devices 110 may include a master device 112. The plurality of devices 110 may include one or more secondary devices 114(1)-(*n*). Each device of the plurality of devices 110 may include a camera 116. The system 100 may include a calibration subject 120. The system 100 may include a computing device 140.

The master device 112 may be operable to calculate, for each of the one or more secondary devices 114(1)-(*n*), a time offset between the master device 112 and the secondary device 114. The master device 112 and the one or more secondary devices 114(1)-(*n*) are each operable to simultaneously capture a first three-dimensional depth frame of the calibration subject 120 at a first time. The first time may be based on the time offsets. Each of the master device 112 and the one or more secondary devices 114(1)-(*n*) may capture their respective first three-dimensional depth frame using their respective camera 116.

Figure 1B:
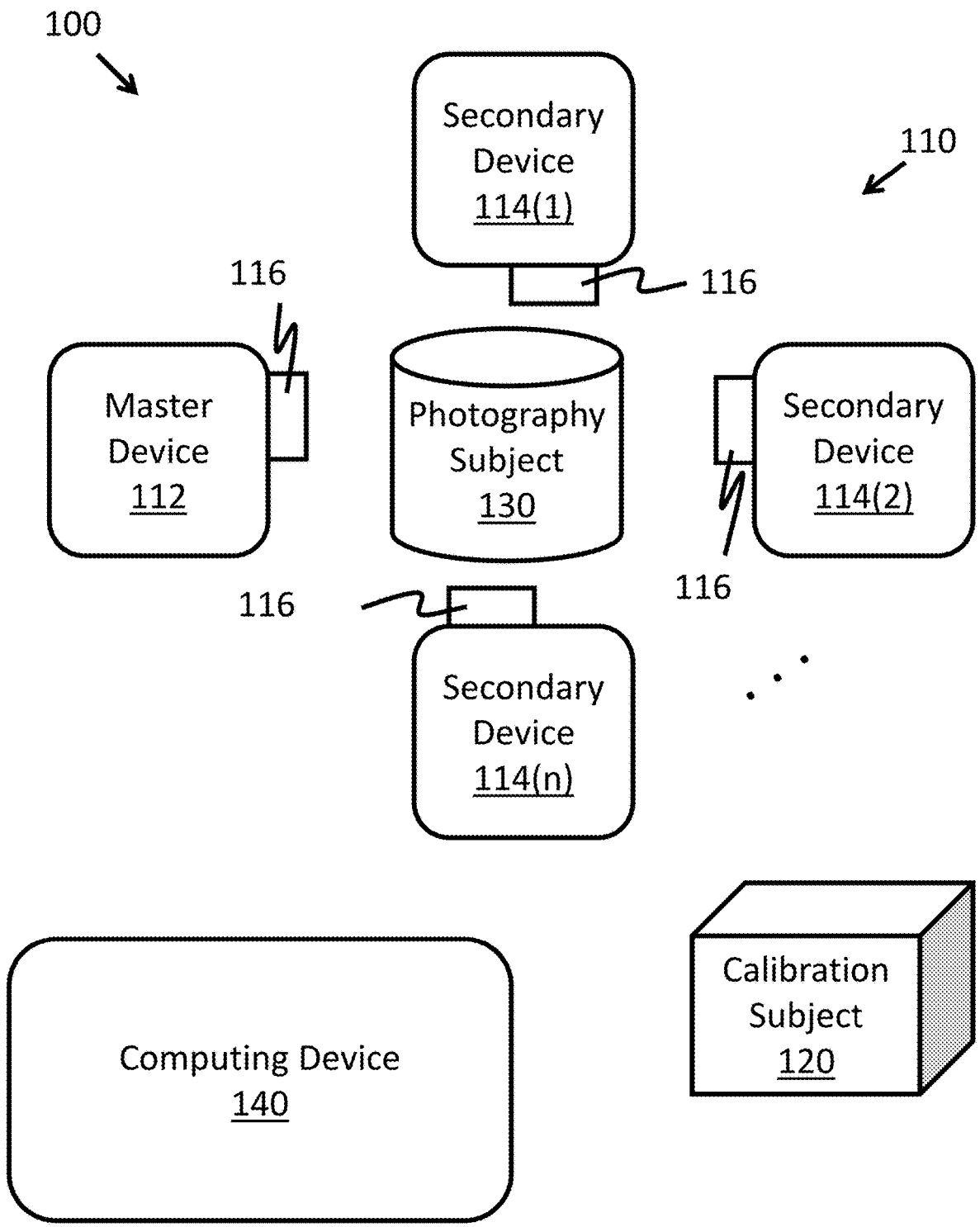
FIG. 1B is a schematic block diagram illustrating one embodiment of a system for capturing a three-dimensional image.

FIG. 1B depicts the system 100. In the system 100 depicted, the photography subject 130 has been placed where the calibration subject 120 had been in FIG. 1A, i.e., in view of the master device 112 and the one or more secondary devices 114(1)-(*n*). The master device 112 and the one or more secondary devices 114(1)-(*n*) are each operable to simultaneously capture a second three-dimensional depth frame of the photography subject 130 at a second time. The second time may be based on the time offsets. The each of the master device 112 and the one or more secondary devices 114(1)-(*n*) may capture their respective second three-dimensional depth frame using their respective camera 116. The computing device 140 may be operable to assemble, based on the second three-dimensional depth frames, a three-dimensional data representation of the photography subject 130.

Figure 2:
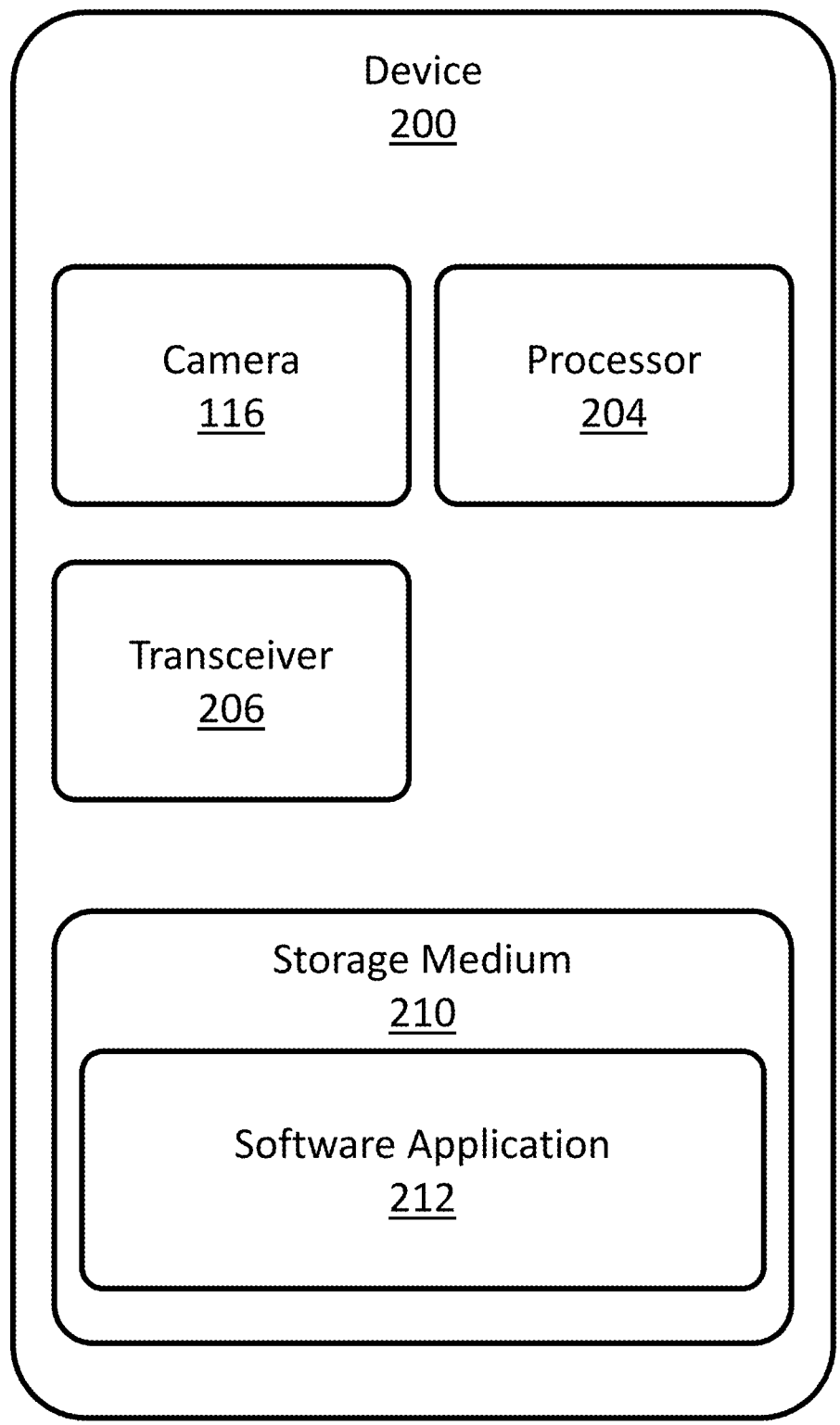
FIG. 2 is a schematic block diagram of the device from FIG. 1.

Each of the master device 112 and each of the one or more secondary devices 114(1)-(*n*) may include exemplary devices 200 as depicted in FIG. 2. Each device 200 may include a device operable to capture an image to be used in three-dimensional imagery. In some embodiments, the device 200 may include a computing device. The device 200 may include a camera 116. The camera 116 may include a digital camera, a phone camera, a single- or twin-lens reflex camera, a video camera, or some other type of camera device. The camera 116 may include components operable to capture an image. The components may include lenses, mirrors shutters, semiconductors, or other camera components. The camera 116 may include distance-sensing components. The distance-sensing components may sense the distance from the camera 116 to an object. The distance-sensing components may include infrared emitters, lenses, or other distance-sensing components.

Each device 200 may include a processor 204. The processor 204 may process data, computer-readable instructions, or other information on the device 200. The processor 204 may include a computer processor, a central processing unit (CPU), a microprocessor, an image processor, a multi-core processor, or some other type of processor. The processor 204 may cause other components of the device 200 to perform certain functions.

Each device 200 may include a transceiver 206. The transceiver 206 may be operable to receive data from another device. The transceiver 206 may be operable to transmit data to another device. The transceiver 206 may include a wired or a wireless transceiver. The transceiver 206 may include a Bluetooth transceiver, a Wi-Fi transceiver, a cellular data transceiver, a near-field communication (NFC) transceiver, or some other wireless transceiver. In some embodiments, the transceiver 206 may include a universal serial bus (USB) port, a Lightning connector, or some other wired connection component.

The device 200 may include a storage medium 210. The storage medium may be operable to store data. The storage medium 210 may include a non-transitory, computer-readable storage medium. The storage medium 210 may include volatile or non-volatile memory. The storage medium 210 may include random access memory (RAM), flash memory, a hard disk drive (HDD), or other storage media. The storage medium 210 may include a software application 212. The software application 212 may be operable to capture an image (using the camera 116), process the image, and transmit the image to another device. The software application 212 may include software that includes one or more computer-readable instructions. The computer-readable instructions may be executable by the processor 204.

In one or more embodiments, the software application 212 of a device of the plurality of devices 110 may be operable to establish a data connection between the device and another device of the plurality of devices 110. Establishing a data connection may include Bluetooth pairing, joining a Bluetooth network, joining a Wi-Fi network, or another function that establishes data communication between devices. The software application 212 may be operable to cause a device of the plurality of devices 110 to act as either the master device 112 or as a secondary device 114. In some embodiments, the software applications 212 of the plurality of devices 110 may coordinate to randomly select one of the devices to act as the master device 112. In other embodiments, a user may interact with a user interface of the software application 212 of one of the plurality of devices 110 to designate that device as the master device 112. The remaining devices may then be designated as the one or more secondary devices 114(1)-(n).

The software application 212 of the master device 112 may be operable to calculate a time offset between the master device 112 and each of the one or more secondary devices 114(1)-(n). The software application 212 of each of the plurality of devices 110 may be operable to capture, using the camera 116 of the device, a three-dimensional depth frame of a subject. The subject may include the calibration subject 120 or the photography subject 130. The software application 212 of each of the plurality of devices 110 may be operable to capture the three-dimensional depth frames simultaneously based on the time offsets.

In one embodiment, the software application 212 of each of the plurality of devices 110 may be operable to send the three-dimensional depth frame to the computing device 140. In another embodiment, the software application 212 of each of the one or more secondary devices 114(1)-(n) may send the three-dimensional depth frame to the master device 212. The software application 212 of the master device 112 may assemble, based on the received three-dimensional depth frames of the photography subject 130, a three-dimensional data representation of the photography subject 130, or the software application 212 of the master device 112 may send the three-dimensional depth frames to the computing device 140, and the computing device 140 may perform the assembly of the three-dimensional data representation of the photography subject 130. The software application 212 may perform other functions.

In one or more embodiments, the processor 204, storage medium 210, or software application 212 may be located externally from the device 200. For example, the processor 204, storage medium 210, or software application 212 may be located on the computing device 140 or on some other computing device. Thus, in some embodiments, the device 200 may include primarily image capture functionality, and computing or other functionality may occur on some other device.

In some embodiments, the calibration subject 120 may include a first object. The first object may include an object whose dimensions are known by one of the plurality of devices 110, the computing device 140, a user of the system 100, or something else. The calibration subject 120 may include a ruler, a piece of paper, a wall, a floor, or some other object. The photography subject 130 may include a second object. The second object may include an object whose dimensions are not known. The photography subject 130 may include clothing, clothing on a model or mannequin, a commercial product, or some other object.

The computing device 140 may include a smartphone, a tablet computer, a laptop computer, a desktop computer, an application server, a database server, a cloud computing cluster, or some other type of computing device. The computing device 140 may include a processor, storage media, or one or more software applications. The computing device 140 may be operable to receive three-dimensional depth frames from the plurality of devices 110 and assemble the depth frames into data representing a three-dimensional image.

Figure 3:
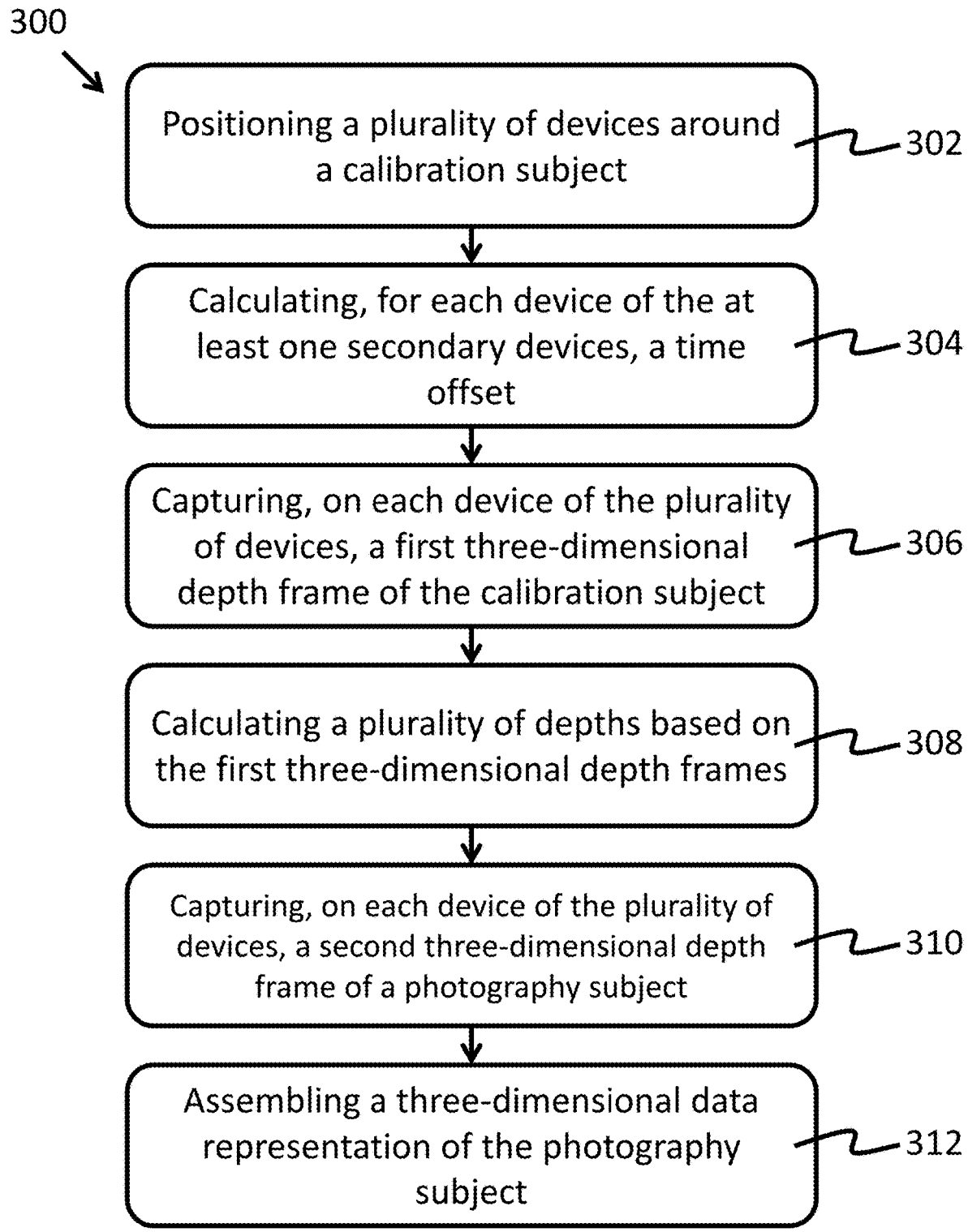
FIG. 3 is a flowchart diagram illustrating one embodiment of a method for capturing a three-dimensional image using components from the system of FIG. 1.

FIG. 3 depicts one embodiment of a method 300 for generating a three-dimensional image. The method 300 may include positioning 302 a plurality of devices 110 around the calibration subject 120. The plurality of devices 110 may include the master device 112 and one or more secondary devices 114(1)-(n). The method 300 may include calculating 304, for each of the one or more secondary devices 114(1)-(n), a time offset between the master device 112 and the secondary device 114. The method 300 may include capturing 306, on each of the plurality of devices 110, a first three-dimensional depth frame of the calibration subject 120. The plurality of devices 110 may capture the first three-dimensional depth frames simultaneously based on the time offsets.

The method 300 may include calculating 308 a plurality of depths. The plurality of depths may be based on the first three-dimensional depth frames. The method 300 may include capturing 310, on each of the plurality of devices 110, a second three-dimensional depth frame of the photography subject 130. The plurality of devices 110 may capture the second three-dimensional depth frames simultaneously based on the time offsets. The method 300 may include assembling 312, based on the second three-dimensional depth frames, a three-dimensional data representation of the photography subject 130.

In one embodiment, positioning 302 the plurality of devices 110 around the calibration subject 120 may include positioning the plurality of devices 110 such that the cameras 116 face the calibration subject 120. Positioning 302 the plurality of devices 110 may include the plurality of devices 110 being at the same height from the ground as each other or different heights, being generally evenly or symmetrically spaced around the calibration subject 120 or being variably spaced, or being at the same height as the calibration subject 120 or at least one of the plurality of devices 110 being at a different height than the calibration subject 120. Positioning 302 the plurality of devices 110 may include disposing at least one of the plurality of devices 110 on a tripod, crane, wire, arm, or other height- or position-adjusting tool. In some embodiments, positioning 302 the plurality of devices 110 may include the plurality of devices 110 being arranged around the calibration subject 120 such that each portion (or at least, each portion of the calibration subject 120 used for calibration purposes) of the surface of the calibration subject 120 is viewable by at least one of the plurality of cameras 116.

In one embodiment, calculating 304 the time offset may include calculating a time difference between a clock of the master device 112 and a secondary device 114. The time difference may be expressed as a time interval that the secondary device's 114 clock is ahead or behind the master device's 112. For example, the time difference may be 250 milliseconds (indicating that the secondary device's 114 clock is 250 milliseconds ahead of the master device's 112 clock), −500 milliseconds (indicating that the secondary device's 114 clock is 500 milliseconds behind the master device's 112 clock), 0 milliseconds (indicating that the secondary device's 114 clock and the master device's 112 clock are synchronized), or some other value. The time difference may be expressed in various units (e.g., seconds, milliseconds, microseconds, or some other time unit).

Figure 4:
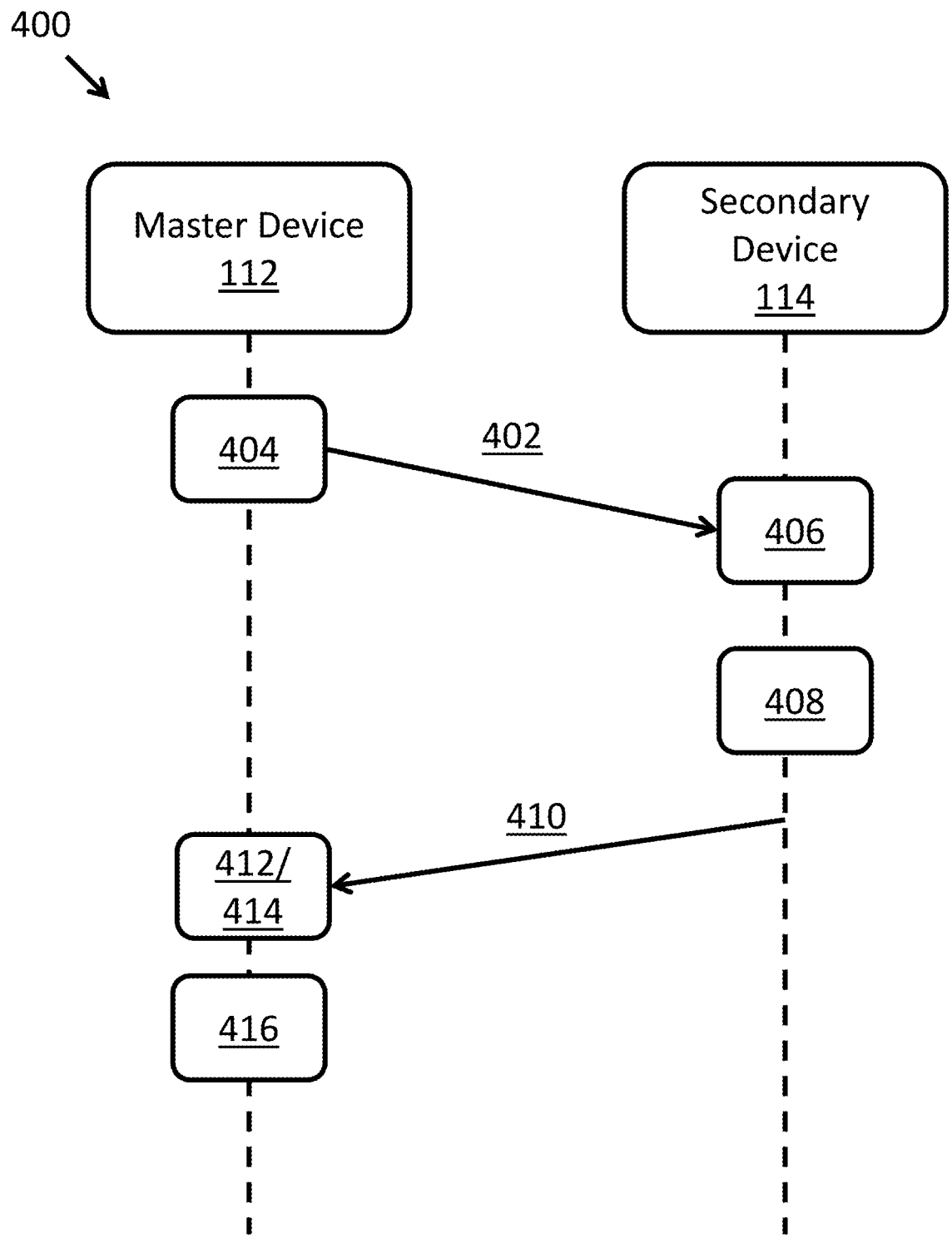
FIG. 4 is an action flowchart diagram illustrating example interactions between the master device and a secondary device of FIG. 1.

FIG. 4 depicts one embodiment of a flowchart 400 showing how the master device 112 may obtain the time difference between the master device 112 and a secondary device 114. The method 400 may include, at step 402, the master device 112 sending a timestamp request to the secondary device 114 at a first time. At step 404, the master device 112 may store a first timestamp (according to its own clock) corresponding to the first time. At step 406, the secondary device 114 may receive the timestamp request. At step 408, the secondary device 114 may determine a second timestamp (according to its own clock) at which it processed the timestamp request. The second timestamp may correspond to a second time. At step 410, the secondary device 114 may send a response back to the master device 112. The response may include the second timestamp. At step 412, the master device 112 may receive the response from the secondary device 114 at a third time. At step 414, the master device 112 may store a third timestamp (according to its own clock) corresponding to the third time (i.e., the time at which the master device 112 received the response). At step 416, the master device 112 may calculate the time difference using the first timestamp, the second timestamp, and the third timestamp.

In one embodiment, the time difference may be calculated according to the equation $$T_d = T_s - \frac{T_t + T_r}{2}$$

where $T_d$ is the time difference, $T_t$ is the first timestamp (i.e., the time the master device 112 sent the timestamp request, according to its own clock), $T_s$ is the second timestamp (i.e., the time the secondary device 114 processed the timestamp request, according to its own clock), and $T_r$ is the third timestamp (i.e., the time the master device 112 received the response from the secondary device 114, according to the master device's 112 own clock).

As an example, FIG. 5 depicts a table 500. In the table 500, the first column 502 shows the time elapsed since the start of the example, the second column 504 shows the time according to the master device's 112 clock, and the third column 506 shows the time according to the secondary device's 114 clock. In the example, at time elapsed=0 (i.e., the first row of the table), the clock of the master device 112 may be 4:00:00.000 and the clock of the secondary device 114 may be 4:00:00.347. Thus, the clock of the secondary device 114 is 347 milliseconds ahead of the master device's 112 clock. At 4:00:00.000, the master device 112 may send the timestamp request to the secondary device (step 402). The master device 112 may store 4:00:00.000 as the first timestamp, $T_t$ (step 404). The timestamp request may take 100 milliseconds to be received by the secondary device 114. Thus, at time elapsed=100 (i.e., the second row of the table), the secondary device 114 may receive the timestamp request (step 406). The secondary device 114 may process the timestamp request and determine that the second timestamp (according to its own clock), $T_s$, is 4:00:00.447 (step 408). The secondary device 114 may send the response back to the master device 112, and the response may include the second timestamp of 4:00:00.447. The response may take 97 milliseconds to be received by the master device 112. Thus, at time elapsed=197 milliseconds (i.e., the third row of the table), the master device 112 may receive the response (step 412) and determine that the third timestamp, the time the master device 112 received the response (according to its own clock), $T_r$, is 4:00:00.197 (step 414). The master device 112 may calculate the time difference using the first, second, and third timestamps (step 416). Calculating the time difference may include using the equation above with the first, second, and third timestamps, i.e., Td=4:00:00.447−(4:00:00.000+4:00:00.197)/2=348.5. Thus, the master device 112 calculates that the clock of the secondary device 114 is 348.5 milliseconds ahead of the clock of the master device 112. Thus, the time difference, in this example, may include 348.5 milliseconds.

In some embodiments, the master device 112 may perform actions to obtain a potentially more accurate time difference. For example, the master device 112 may cause the master device 112 and the secondary device 114 to perform the steps 402-416 of the flowchart 400 multiple times to obtain an average (mean, median mode, etc.) time difference.

In other embodiments, the time offset may include a calculated transmission time from the master device 112 to the secondary device 114. The master device 112 may send a request to the secondary device 114. The request may include data requesting that the secondary device 114 send a response to the master device 112. The request may include a ping or other response-requesting type of request. The master device 112 may store a first timestamp that indicates the time at which the master device 112 sent the request. The secondary device 114 may receive the request and send the response. The master device 112 may receive the response. The master device 112 may determine a third timestamp that indicates the time at which the master device 112 received the request. The master device 112 may calculate the calculated transmission time based on the first and third timestamp. In one embodiment, calculating the calculated transmission time may include adding the first and third timestamps together and divide the sum by two. This may calculate a mean transmission time between the master device 112 and the secondary device 114.

The master device 112 may calculate a time offset for each of the one or more secondary devices 114(1)-(n). The master device 112 may store these time offsets and data associating each of them with their respective secondary device 114 in the storage medium 210.

In some embodiments, capturing 306, on each of the plurality of devices 110, the first three-dimensional depth frame of the calibration subject 120 may include the master device 112 sending a capture request to each of the one or more secondary devices 114(1)-(n). In response to receiving a capture request, the receiving secondary device 114 may capture a first three-dimensional depth frame of the calibration subject 120.

In some embodiments, the receiving secondary device 114 may capture the first three-dimensional depth frame at a capture time specified in the capture request. The master device 112 may have previously calculated the time difference between the master device 112 and the secondary device 114. The master device 112 may calculate the capture time by adding or subtracting the time difference to the time at which the master device 112 will capture its first three-dimensional depth frame of the calibration subject 120.

Figure 6:
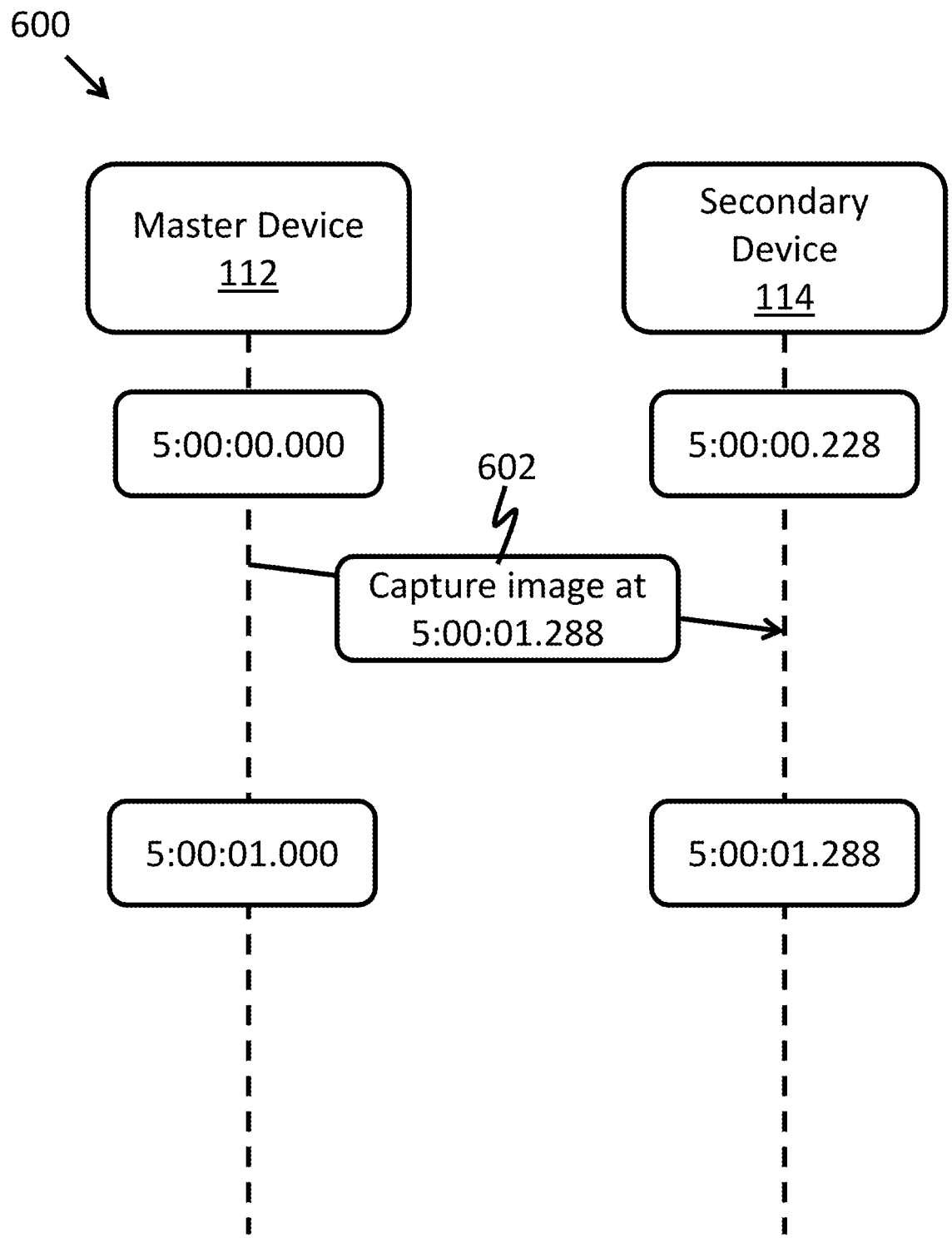
FIG. 6 is an action flowchart diagram illustrating an example interaction between the master device and a secondary device of FIG. 1.

In one example, as depicted in FIG. 6, the master device 112 may have calculated that the time difference between itself and a secondary device 114 is 288 milliseconds (i.e., the clock of the secondary device 114 is 288 milliseconds ahead of the master device's 112 clock). Thus, when the master device's 112 clock is at 5:00:00.000, the secondary device's 114 clock is at 5:00:00.288. Thus, in order for the master device 112 and the secondary device 114 to capture their respective first three-dimensional depth frames simultaneously, the capture time specified in the capture request 602 includes a time 288 milliseconds ahead of the capture time of the master device 112. Therefore, if the master device 112 is to capture its first three-dimensional depth frame at 5:00:01.000, then the capture time in the capture request 602 will be 5:00:001.288.

In other embodiments, the receiving secondary device 114 may capture the first three-dimensional depth frame upon receiving the capture request, and the master device 112 may wait to capture its first three-dimensional depth frame until the predicted time at which the secondary device 114 captures its first three-dimensional depth frame. The master device 112 may wait to capture the first three-dimensional depth frame based on the calculated transmission time between the master device 112 and the secondary device 114. For example, the calculated transmission time may be 359 milliseconds. The master device 112 may send the capture request to the secondary device 114, wait 359 milliseconds, and then capture its first three-dimensional depth frame. In some embodiments, where there are multiple secondary devices 114(1)-(n), the master device 112 may send the capture requests in the order of longest calculated transmission time to shortest calculated transmission time.

In one embodiment, the method 300 may include calculating 308 the plurality of depths based on the first three-dimensional depth frames. A depth of the plurality of depths may include an estimated distance from the camera 116 of each device of the plurality of device 110 to a corresponding point on the calibration subject 120. The camera 116 may use the distance-sensing components of the camera 116 to generate a plurality of points on the calibration subject 120. The camera 116 may use the distance-sensing components to measure the distance from the camera 116 to each of those points. However, the distance measured by the camera 116 may be inaccurate (e.g., due to the limitations of the hardware of the camera 116). A first three-dimensional depth frame may include the plurality of points and the associated measured distances.

Because of the possible inaccuracies of the distances measured by the camera 116, calculating 308 the plurality of depths may include calibrating a measured distance. In some embodiments, in response to the measured distance being less than a predetermined distance threshold, the calibrated depth may be equal to the measured distance. This may be because the hardware of the camera 116 may be more accurate when working with close-up objects than further-away objects. For example, the predetermined distance threshold may be 0.5 meters. Thus, in response to the measured distance being less than 0.5 meters, the calibrated depth may be equal to the measured distance. The predetermined distance threshold may include another suitable value. The predetermined distance threshold may be different for different cameras.

In response to the measured distance being equal to or greater than the predetermined distance threshold, the calibrated depth may be calculated. In one embodiment, the calibrated depth may be calculated according to the equation $$D_c = \alpha * (D_d - p)^2 + p$$

where $D_c$ is the calibrated depth, $\alpha$ is a depth correction factor, $D_d$ is the measured distance (i.e., the distance measured by the camera and which may be inaccurate), and p is the predetermined distance threshold.

In some embodiments, calculating the depth correction factor, $\alpha$, may include using a portion of the known dimensions of the calibration subject 120 in the calculations. Calculating the depth correction factor may include selecting a plurality or patch of points in the first three-dimensional depth frame. Selecting the plurality of points may include selecting 30-100 points or some other range of points. Calculating the depth correction factor may include performing singular value decomposition on the plurality of points to obtain a vector that is approximately normal to the plurality of points. Calculating the depth correction factor may include formulating a polynomial error function based on the vector. Calculating the depth correction factor may include using partial derivatives of the error function with respect to the depth correction factor and gradient descent to determine the value of the depth correction factor that minimizes the polynomial error function. This determined value of the depth correction function may be used as a in the above equation.

In one embodiment, calculating the depth correction factor may include adjusting the angle between two or more surfaces to be closer to or substantially equal to 90 degrees. Calculating the depth correction factor may include minimizing a square of a dot product of a first vector and a second vector. The first vector may include a vector perpendicular to corrected points on the first surface, and the second vector may include a vector perpendicular to corrected points on the second surface. Calculating the depth correction factor may include computing the derivative of the dot product as a function of the depth correction factor. Calculating the depth correction factor may include using the derivative with Newton-Raphson to calculate an optimal depth correction factor. In some embodiments, the two or more surfaces may include (1) a floor surface and a wall surface, (2) a ceiling surface and a wall surface, (3) two wall surfaces, (4) two wall surfaces and a floor surface, (5) two wall surfaces and a ceiling surface, or (6) other surfaces.

Calculating 308 the plurality of depths may include calculating, for each device in the plurality of devices 110, the plurality of depths. In one embodiment, each device of the plurality of devices 110 may calculate 308 its own plurality of depths based on its first three-dimensional depth frame. In other embodiments, the master device 112 may calculate the plurality of depths for each device of the plurality of devices 110 (based on their respective first three-dimensional depth frames), or the computing device 140 may calculate 308 the plurality of depths for the plurality of devices 110.

Figure 7:
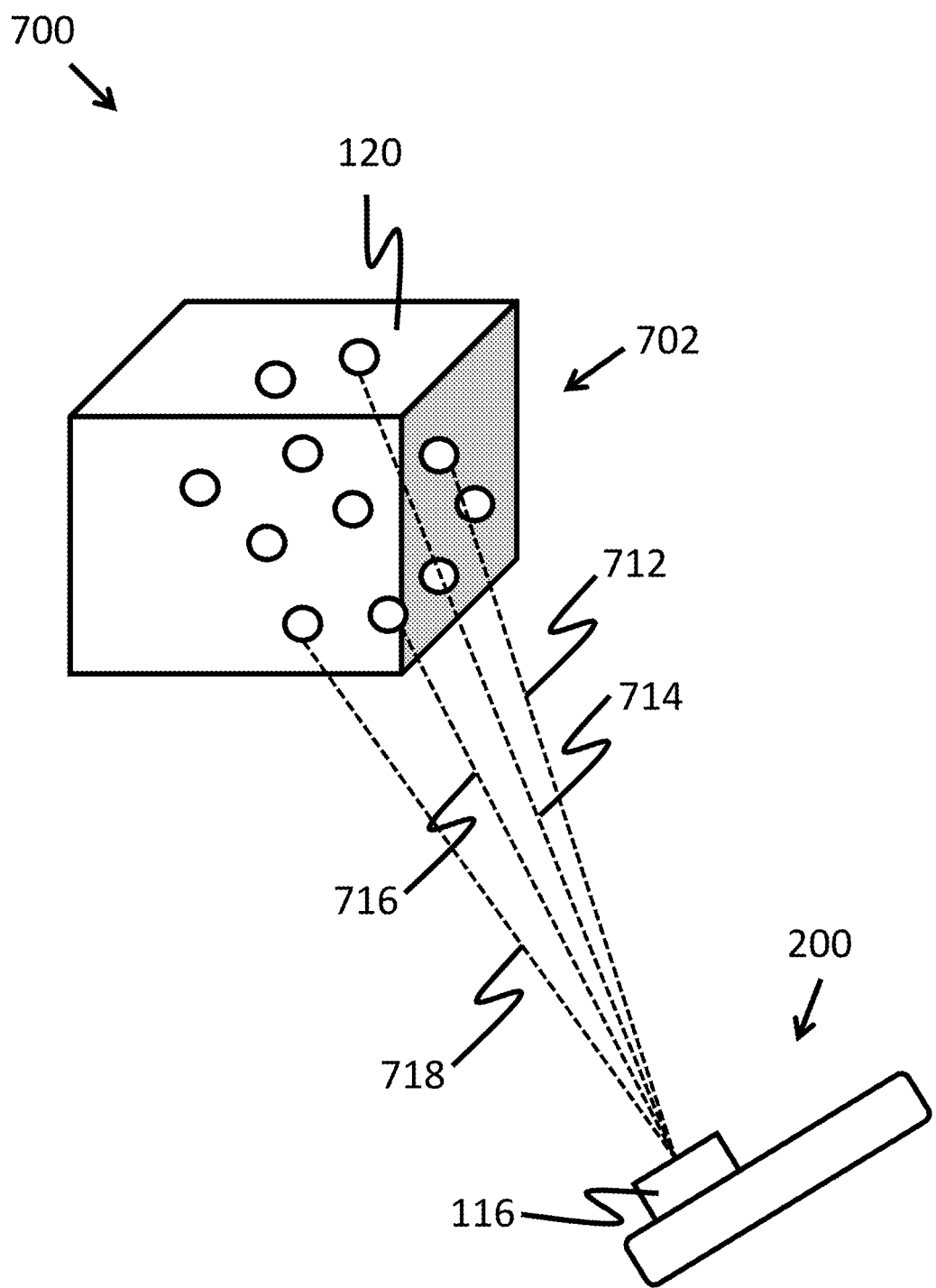
FIG. 7 is a perspective view illustrating a plurality of points and estimated distances to those points from the device of FIG. 2.

FIG. 7 depicts one embodiment of a system 700. The system 700 may include the device 200. The device 200 may include the camera 116. The device 200 may include the master device 112 or a secondary device 114. The system 700 may include the calibration subject 120. The system 700 may include the plurality of points 702. The plurality of points 702 may be disposed on the calibration subject 120. The camera 116 may use distance-sensing components to project the plurality of points on the calibration subject 120. The camera 116 may use the distance-sensing components to measure distances 712, 714, 716, or 718 from corresponding points of the plurality of points 702 to the camera 116.

In one embodiment, capturing 310 a second three-dimensional depth frame may include capturing 310 a three-dimensional depth frame of the photography subject 130. A user may remove the calibration subject 120 from its position and place the photography subject 130 in a position near the previous position of the calibration subject 120. The user may perform this replacement without the plurality of devices 110 moving.

Capturing 310 the second three-dimensional depth frame of the photography subject 130 may be similar to capturing 306 the first three dimensional depth frame. Capturing 310 the second three-dimensional depth frames may include the plurality of devices 110 capturing their respective three dimensional depth frames simultaneously based on the time offset. Capturing 310 the second three-dimensional depth frame may include calculating a plurality of depths based on the second three-dimensional depth frame. Calculating the plurality of depths based on the second three-dimensional depth frame may include calculating a calibrated depth, which may not include recalculating the depth correction factor, a. The previously calculated depth correction factor may be used.

In one or more embodiments, assembling 312, the three-dimensional data representation of the photography subject 130 may include using an iterative point cloud algorithm, global affine transformation optimization, Poisson surface reconstruction, or voxel mesh generation.

SIFT (Scale-invariant feature transform) is often used to compute the relative angles and offsets between two different camera images. In one embodiment, if there are n camera images, then there may be n*(n+1)/2 possible relative angles and offsets. These estimated angles and offsets may not be in full agreement. Global affine transformation optimization may find the optimal relative positions of one or more of the cameras used to minimize the least sum squared error between one or more of the estimated angles or offsets.

In one or more embodiments, a three-dimensional data representation may include a stereolithography (STL) file, a .obj file, a Filmbox (FBX) file, a Collaborative Design Activity (COLLADA) file, a .3ds file, or another three-dimensional image file format. In some embodiments, the three-dimensional data representation may include a 2.5 dimensional mesh of the exterior of the photography subject 130 in the common volume, surface normal, or textures.

In some embodiments, the method 300 may include recalculating the time offsets. Recalculating the time offsets may be in response to a predetermined amount of time elapsing since a previous calculation of the time offsets, in response to a user command received at the user interface of the software application 212, or in response to some other event. In some embodiments, the method 300 may include recalculating 308 the plurality of depths or recalculating the depth correction factor. Recalculating 308 the plurality of depths or recalculating the depth correction factor may be in response to a predetermined amount of time elapsing since a previous recalculation of the plurality of depths or the depth correction factor, in response to a user command received at the user interface of the software application 212, or in response to some other event.

As an overview, systems and methods for rendering clothing on a two-dimensional image may include using an image-capturing device to capture a depth frame of a photography subject (e.g., a person), using a computing device to generate a virtual three-dimensional avatar based on the depth frame, using the computing device to manipulate a digital three-dimensional model of an article of clothing to fit on the virtual avatar, render the three-dimensional model of the article of clothing into a two-dimensional image after the model of the article of clothing has been manipulated correctly, and overlay the two-dimensional image of the clothing onto an image of the photography subject. In this manner, the systems and methods disclosed herein may allow a customer to digitally "try on" different clothing and see how the clothing would appear on the customer.

Figure 8:
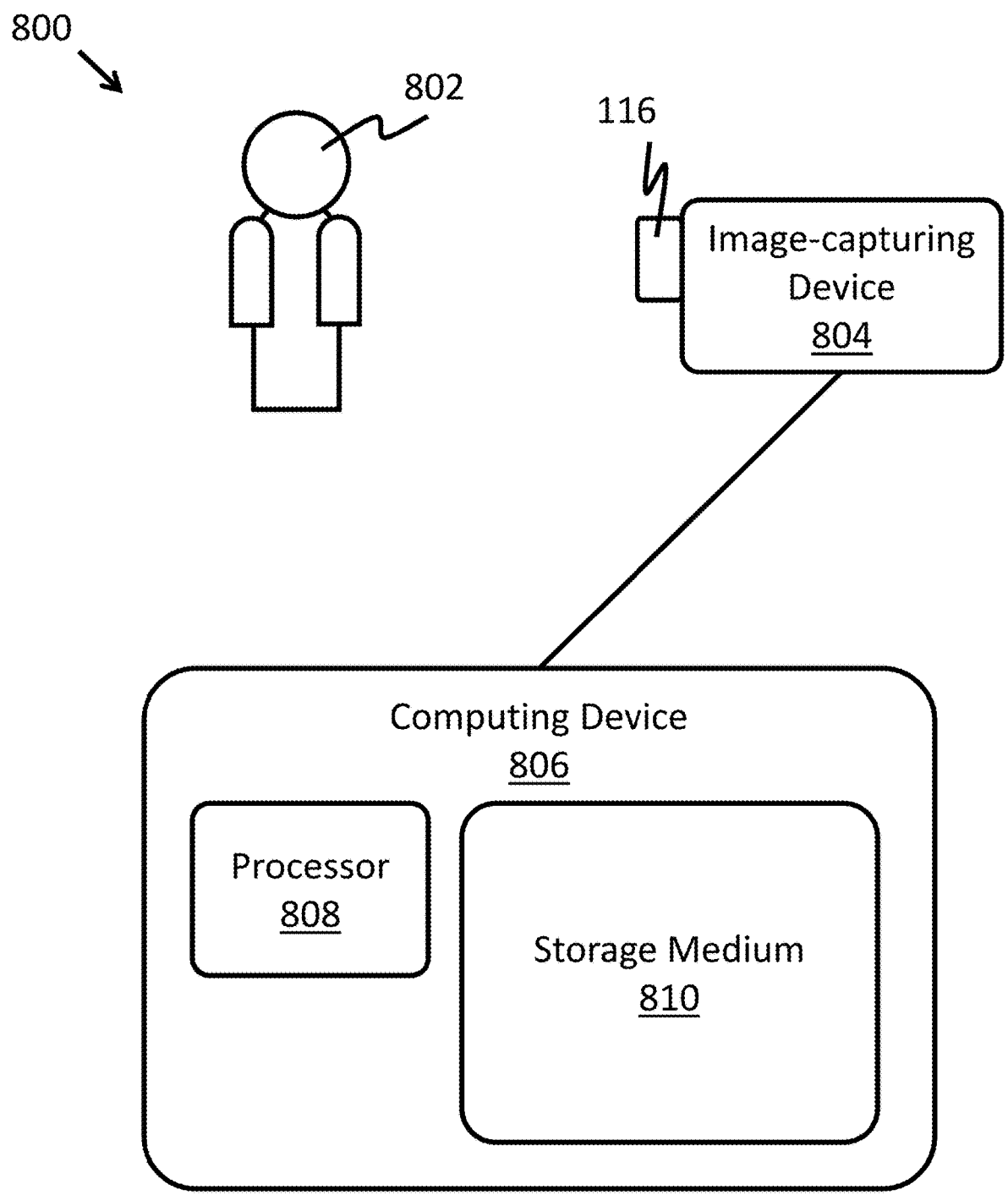
FIG. 8 is a block diagram illustrating one embodiment of a system for rendering clothing on a two-dimensional image.

FIG. 8 depicts one embodiment of a system 800. The system 800 may include a system for rendering clothing on a two-dimensional image. The system 800 may include a photography subject 802. The system 800 may include an image-capturing device 804. The image-capturing device 804 may include a camera 116. The system 800 may include a computing device 806. The computing device 806 may include a processor 808 and a computer-readable storage medium 810.

In one embodiment, the photography subject 802 may be different than the photography subject 130 discussed above in relation to FIG. 1A, FIG. 1B, and FIG. 3. In some embodiments, the photography subject 802 may be the same as the photography subject 130. The photography subject 802 may include a human. The photography subject 802 may include a piece of furniture. The photography subject 802 may include some other object.

In some embodiments, the image-capturing device 804 may include a computing device. The image-capturing device 804 may be configured to capture an image of the photography subject 802. The image may include a depth frame. The image may include a two-dimensional image or some other type of image. In some embodiments, the image-capturing device 804 may be the same as a master device 112 or a secondary device 114 discussed above in relation to FIG. 1A, FIG. 1B, FIG. 3, FIG. 4, or FIG. 6. In one embodiment, the image-capturing device 804 may be different from a master device 112 or a secondary device 114.

In one embodiment, the computing device 806 may include a computing device. The computing device 806 may include software that performs various functions related to rendering clothing on a two-dimensional image. Such functions may include generating a virtual avatar based on the photography subject 802, manipulating a digital three-dimensional model of an article of clothing, calculating lighting and other ambient data, rendering the digital three-dimensional model of the article of clothing into a two-dimensional image, or overlaying the rendered two-dimensional image onto an image of the photography subject 802.

The computing device 806 may include a processor 808 or a storage medium 810. The processor 808 may include a computer processor, which may be similar to or different than the processor 204 of the device 200 of FIG. 2. The storage medium 810 may be similar to or different than the storage medium 210 of the device 200.

Figure 9A:
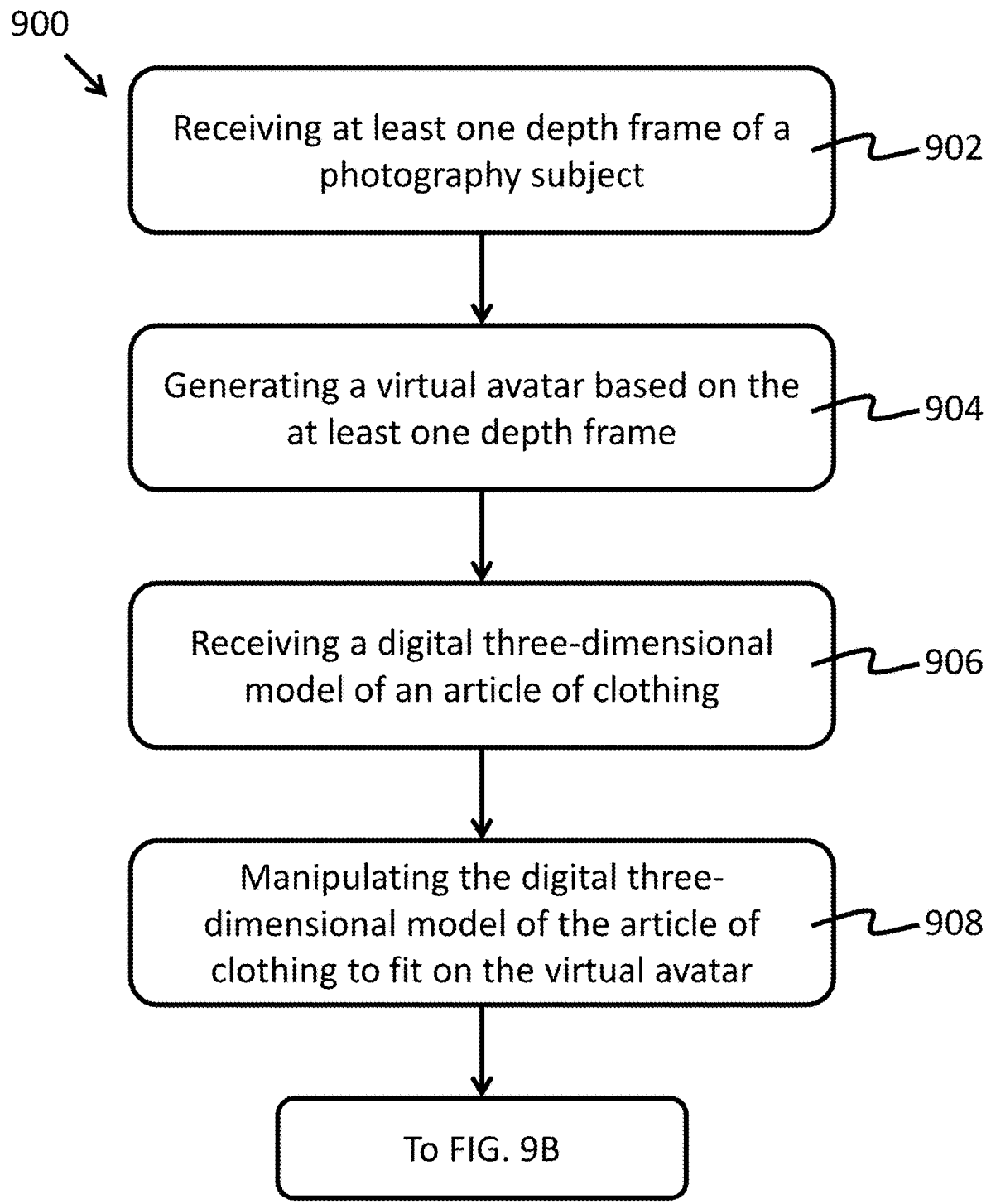
FIG. 9A is a flowchart illustrating one embodiment of a method for rendering clothing on a two-dimensional image.
Figure 9B:
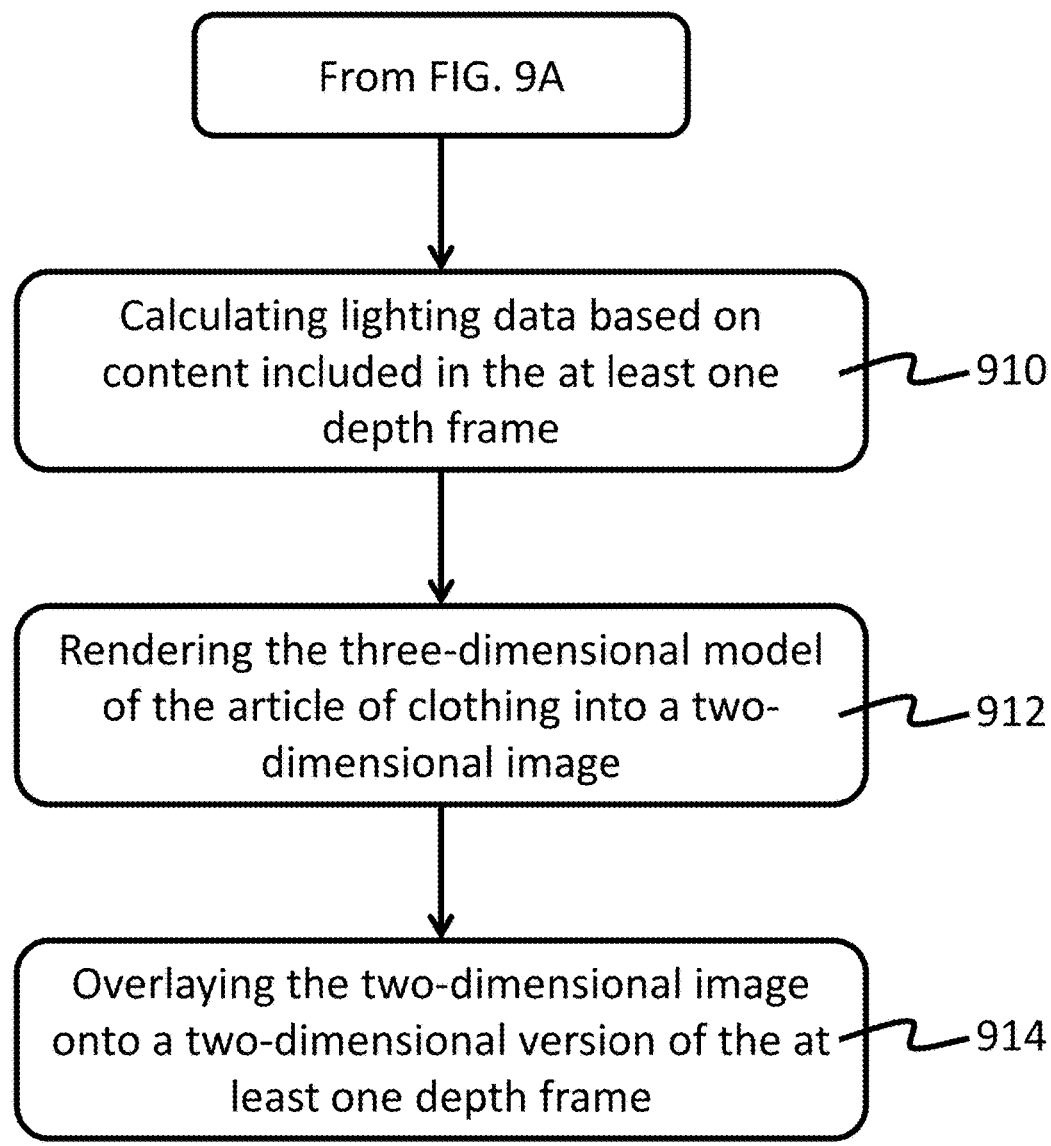
FIG. 9B is a continuation of the flowchart of FIG. 9A.

FIG. 9A and FIG. 9B depict one embodiment of a method 900. The method 900 may include a method for rending clothing on a two-dimensional image. The method 900 may include receiving 902 at least one depth frame of a photography subject 802. The method 900 may include generating 904 a virtual avatar based on the at least one depth frame. The virtual avatar may include a digital three-dimensional mesh. The method 900 may include receiving 906 a digital three-dimensional model of an article of clothing. The method 900 may include manipulating 908 the digital three-dimensional model of the article of clothing to fit on the virtual avatar. The method 900 may include calculating 910 lighting data. The calculating 910 may be based on content included in the at least one depth frame. The method 900 may include rendering 912 the three-dimensional model of the article of clothing into a two-dimensional image. The rendering 912 may be based on the lighting data. The method 900 may include overlaying 914 the two-dimensional image onto a two-dimensional version of the at least one depth frame. In some embodiments, the computing device 806 may perform one or more of the steps 902-914 of the method 900.

In one embodiment, the image-capturing device 804 may capture the at least one depth frame. The at least one depth frame may include a three-dimensional depth frame. The at least one depth frame may include data indicating how far a certain point in the depth frame was from the camera 116. Thus, the depth frame may include data that may help generate a three-dimensional image of the content of the depth frame.

In some embodiments, the at least one depth frame may include an image of at least a portion of the photography subject 802. For example, the photography subject 802 may include a human, and the at least one depth frame may include an image of the entire body of the photography subject 802, the upper body of the photography subject 802 (e.g., at least some of the torso, arms, or head), the lower body of the photography subject 802 (e.g., at least some of the legs, feet, waist, or torso), or some other portion of the photography subject 802. In some embodiments, the at least one depth frame may include a red-green-blue-depth (RGB-D) image.

Figure 10:
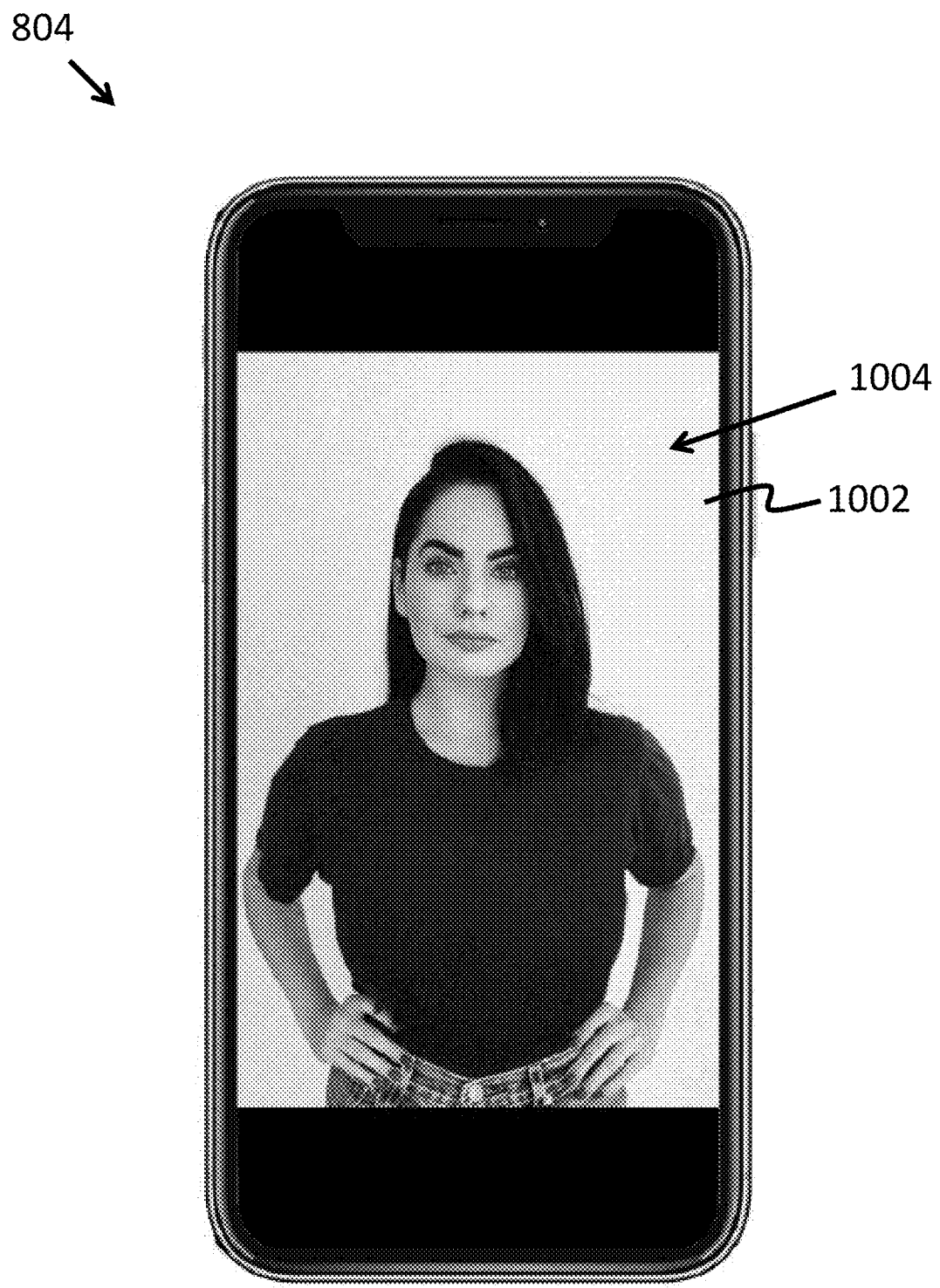
FIG. 10 is a front view illustrating one embodiment of an image-capturing device of a system for rendering clothing on a two-dimensional image.

FIG. 10 depicts one embodiment of the image-capturing device 804. As can be seen in FIG. 10, in some embodiments, the image-capturing device 804 may include a smartphone. The image-capturing device 804 may use its camera 116 (not shown in FIG. 10) to capture the depth frame. The image-capturing device 804 may display a visual representation 1002 of the depth frame on a user interface 1004 of the image-capturing device 804.

In certain embodiments, the computing device 806 may receive 902 the depth frame. The computing device 806 may receive the depth from over a data network. The computing device 806 may store the depth frame, for example, in the storage medium 810. The computing device 806 may store the depth frame as one or more files or other data objects. In some embodiments, the computing device 806 may receive multiple depth frames of the photography subject 802.

In one or more embodiments, the computing device 806 may correct the at least one depth frame. Correcting the at least one depth frame may include using a piecewise quadratic correction function. The computing device 806 may determine a parameter of the piecewise correction function based on a calibration object (e.g., the calibration subject 120 of FIG. 1). The computing device 806 may determine a parameter of the piecewise correction function by computing two or more normals to perpendicular flat surfaces in the at least one depth frames. The perpendicular flat surfaces may include a floor, a ceiling, or one or more walls.

In some embodiments, the method 900 may further include receiving a body measurement. The body measurement may include a body measurement of the photography subject 802. The body measurement may include a height of the photograph subject 802, a waist size of the photography subject 802, a neck size of the photography subject 802, an arm circumference of the photography subject 802, a leg circumference of the photography subject 802, or some other body measurement. In some embodiments, receiving the body measurement may be based on what portion or portions of the photography subject 802 are included in the at least one depth frame. For example, if the photography subject's 802 entire body is included, the body measurement may include the photograph subject's 802 height. If the photography subject's 802 waist is included, the body measurement may include the waist size. If the photography subject's 802 neck is included, the body measurement may include the neck size. In some embodiments, the body measurement may be included in the depth frame. The body measurement may be included in a separate file sent with the depth frame. A user may input the body measurement into a user interface in data communication with the computing device 806.

In certain embodiments, the at least one depth frame may include a close-up image of at least a portion of the photography subject 802. A close-up image may include an image captured when the camera 116 is less than 2 feet away from the camera 116. Using a depth frame with a close-up image may assist with more accurately modeling portions of the photography subject 802, such as a contour of the photography subject 802.

Figure 11:
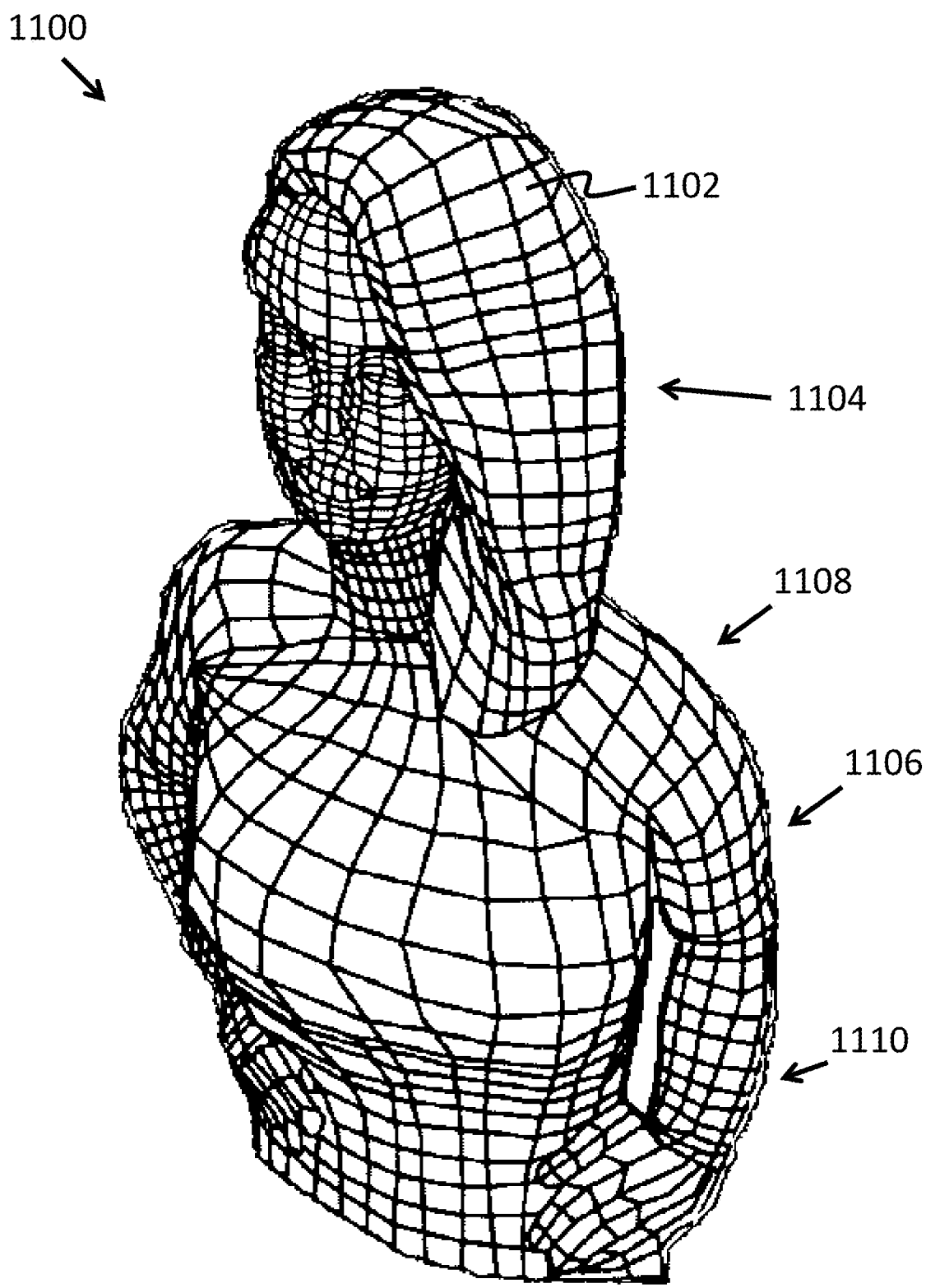
FIG. 11 is a perspective view illustrating one embodiment of a visual representation of a virtual avatar of a system for rendering clothing on a two-dimensional image.

In one embodiment, the computing device 806 may generate 904 the virtual avatar. The virtual avatar may be based on the at least one depth frame. The virtual avatar may include a digital three-dimensional mesh. The virtual avatar may include a three-dimensional, triangulated mesh that may represent at least a portion of the photography subject 802. FIG. 11 depicts one embodiment of a virtual avatar 1100. The virtual avatar 1100 may include a virtual avatar that corresponds to the image of the depth frame depicted in FIG. 10. In some embodiments, the virtual avatar 1100 may include one or more frustums 1102. The virtual avatar may include one or more ellipsoids. The multiple frustums and ellipsoids may form a three-dimensional mesh that may form the virtual avatar 1100.

In some embodiments, a mesh may include a three-dimensional vertex matrix. The vertex matrix may include a matrix of size $N_1 \times 3$ where $N_1$ may include an integer between 1,000 and 1,000,000. The mesh may include a first plurality of triangles with three positive indices for each triangle. The indices may point to entries in the three-dimensional vertex matrix. The mesh may include an image texture file (which may include a .png file or a .jpg file). The mesh may include a two-dimensional UV vertex matrix. The UV vertex matrix may include a matrix of size $N_3 \times 2$ where $N_3$ includes an integer between 1,000 and 1,000,000. In some embodiments, $N_3$ may be larger than $N_1$. The values in the UV vertex matrix may include numbers between 0 and 1 and may indicate the position of the vertex in the text file. The mesh may include a second plurality of triangles with three positive indices for each triangle. The indices may point to entries in the UV vertex matrix.

In certain embodiments, a mesh may include one or more image files for height deviations, reflectance, or normals. A mesh may include a plurality of vertex normals that may include one normal for each three-dimensional vertex.

In one embodiment, integrating a close-up image may include locating the camera position accurately. This may include utilizing scale-invariant feature transformation (SIFT). For each pixel in the close-up image, the computing device 806 may locate a corresponding pixel or pixels in a UV color texture that may be associated with the virtual avatar 1100. In some embodiments, the computing device 806 may perform a global color correction on the close-up image such that the corresponding pixel(s) match more closely in brightness or hue. This color correction may include minimizing the squared error in RGB space. In one embodiment, the computing device 806 may perturb a three-dimensional matrix of the virtual avatar 1100 such that the colors match the close-up image. This may include using a least squares difference of RGB values and adding a penalty term corresponding to the perturbation distance from the original vertex position to the new perturbed position divided by the uncertainty of the positions. Next, for each pixel in the close-up image, the computing device 806 may locate the corresponding pixel(s) in the UV color texture associated with the virtual avatar 1100 and change the color of the corresponding pixel(s) according to the equation $$v_{new} = \lambda * v_{old} + (1 - \lambda) * u_{close}$$

where $v_{old}$ is the color of the corresponding pixel(s) in the UV color texture of the virtual avatar 1100, $v_{new}$ is the updated color of the pixel(s) in the UV color texture of the virtual avatar 1100, $u_{close}$ is the associated pixel(s) in the close-up image, and $\lambda$ is a parameter that varies from 0.7 to 1. In some embodiments, $\lambda$ may be equal to $0.7d/w+(1-d/w)$ where d is the distance from the close-up pixel to the edge of the close-up image and w is half of the largest dimension in the pixels of the close-up image.

In one embodiment, generating 904 the virtual avatar 1100 may include inputting, into the virtual avatar 1100, one or more configurations of the virtual avatar 1100. Inputting a configuration of the virtual avatar 1100 may include inputting into a software program executing on the computing device 806, and the software program may generate the virtual avatar 1100. In one embodiment, a configuration may include an angle of the head 1104 of the human body relative to the remainder of the human body.

In some embodiments, a body point may include a point on the three-dimensional triangular mesh of the virtual avatar 1100 that corresponds to a certain point on the body of a human. A body point may include an ankle, a middle toe of a foot, a knee, a hip joint, a perineum, a shoulder, an elbow, a wrist, a neck, or an apex of the head. In some embodiments, positions of one or more body points may be obtained by running a pose-recognition machine learning model on the at least one depth frame. The output of the pose-recognition machine learning model may include the positions of one or more body points.

The configuration of the virtual avatar 1100 may include the relative position of a line segment joining two or more body points. Further discussion of the machine learning model is given below. In some embodiments, the configuration may include the angle between the upper arm 1106 (e.g., the portion of the arm including the humerus) of the human body and a shoulder 1108 of the human body. The configuration may include an angle between the upper arm 1106 of the human body and the lower arm 1110 (e.g., the portion of the arm including the radius) of the human body. The configuration may include an orientation of a hand or a finger, which may include an angle relative to another portion of the human body, whether a finger is curled and by how much, or other orientation information. In some embodiments, the configuration may include a difference between an orientation of the shoulders 1108 of the human body and an orientation of the hips of the human body. The configuration may include a curvature of the spine of the human body. The configuration may include an angle between the spine of the human body and the upper leg (e.g., the portion of the leg that includes the femur) of the human body. The configuration may include an angle between the upper leg of the human body and the lower leg (e.g., the portion of the leg that includes the tibia) of the human body. In some embodiments, the configuration may include a length of a bone. In some embodiments, the input may be based on input entered by a user via a user input. The input may be based on the depth frame (e.g., software may analyze the depth frame and calculate one or more of the configurations based on the analysis).

In some embodiments, generating 904 the virtual avatar 1100 may include modifying a first portion of the virtual avatar 1100 relative to a proportion of a second portion of the virtual avatar. For example, modifying a first portion of the virtual avatar 1100 may include inflating or deflating one or more frustums 1102 or ellipsoids to better match the depth frame. This may include enlarging or shrinking a waist, thigh, or arm diameter. In some embodiments, generating 904 the virtual avatar 1100 may include minimizing the least squares error between the virtual avatar 1100 and the depth frame.

Figure 12A:
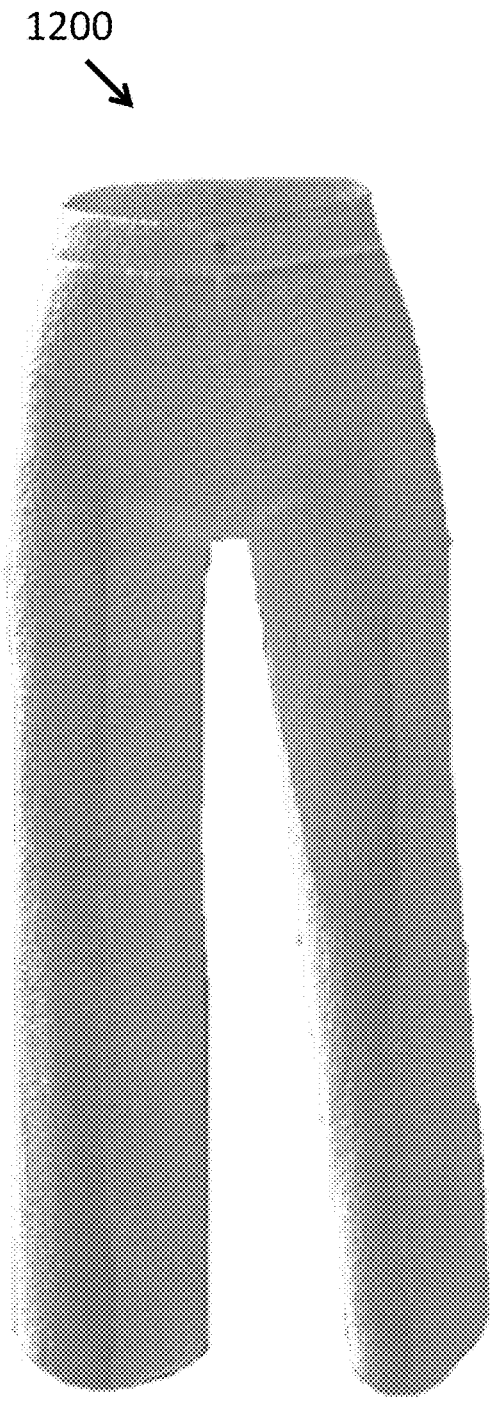
FIG. 12A is a front view illustrating one embodiment of a visual representation of a digital three-dimensional model of an article of clothing for a system for rendering clothing on a two-dimensional image.
Figure 12B:
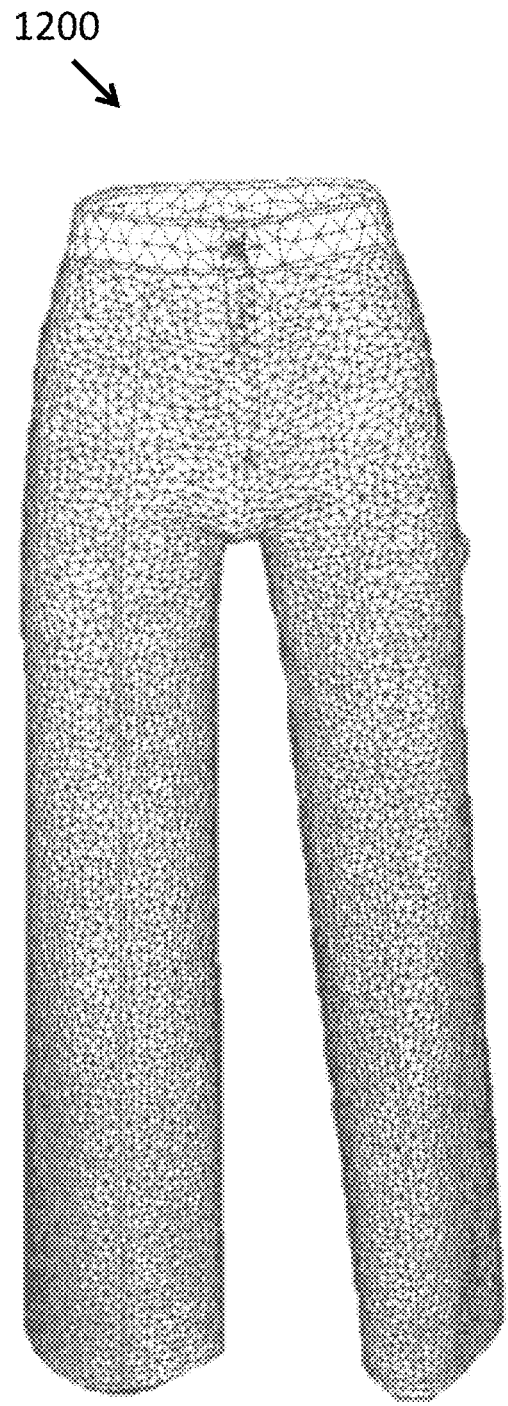
FIG. 12B is a front view of illustrating one embodiment of a visual representation of a mesh of the digital three-dimensional model of the article of clothing of FIG. 12A.

The method 900 may include receiving 906 the digital three-dimensional model of an article of clothing. The digital three-dimensional model of the article of clothing may include a file such as an STL file, an OBJ file, or a 3MF file. The digital three-dimensional model of the article of clothing may include a three-dimensional triangulated mesh. FIG. 12A and FIG. 12B depict a visual representation of a digital three-dimensional model of the article of clothing 1200.

In some embodiments, the digital three-dimensional model of the article of clothing 1200 may include one or more body points. Similar to a body point of the virtual avatar 1100, a body point of the digital three-dimensional model of the article of clothing 1200 may include a point that corresponds to a location on the human body. A body point on the digital three-dimensional model of the article of clothing 1200 may include a point at or near a corresponding body point of the digital avatar 1100. For example, the digital three-dimensional model of the article of clothing 1200 for a long-sleeve shirt may include a body point for each shoulder, a body point for a neck (e.g., near the collar of the shirt), or a body point for a wrist (e.g., near the end of a sleeve).

In one embodiment, the computing device 806 may store the digital three-dimensional model of the article of clothing 1200 in the storage medium 810. The computing device 806 may receive the digital three-dimensional model of the article of clothing 1200 from an external computing device. For example, the computing device 806 may download the digital three-dimensional model of the article of clothing 1200 from a server of a clothing retailer or from an external data that stores digital three-dimensional models of articles of clothing 1200. In one embodiment, receiving 906 the digital three-dimensional model of an article of clothing 1200 may include generating the digital three-dimensional model of an article of clothing 1200 using one or more of the steps 302-312 of the method 300 of the FIG. 3 and the related functionality discussed above. The photography subject 130 may include the article of clothing being digitized into the digital three-dimensional model of the article of clothing 1200.

The method 900 may include manipulating 908 the digital three-dimensional model of the article of clothing 1200 to fit on the virtual avatar 1100. In some cases, the pose of the digital three-dimensional model of the article of clothing 1200 as received 906 by the computing device 804 may not fit the pose of the virtual avatar 1100. For example, a leg of the virtual avatar 1100 may be bent, and the corresponding leg of digital three-dimensional model 1200 of a pair of pants may be positioned in a straight configuration. In one embodiment, manipulating 908 the digital three-dimensional model of the article of clothing 1200 may include bending or stretching the digital three-dimensional model of the article of clothing 1200 to fit on the virtual avatar 1100.

In one embodiment, the bending or stretching of the digital three-dimensional model of the article of clothing 1200 may include calculating a smooth bijection between the three-dimensional space of the digital three-dimensional model of the article of clothing 1200 and the three-dimensional space of the virtual avatar 1100. The bijection may include a mapping that may be twice differentiable. Calculating the mapping may include calculating a mapping with the lowest norm in which an axis of a portion of the virtual avatar 1100 matches an axis of a corresponding portion of the digital three-dimensional model of the article of clothing 1200. In one embodiment, the differentiable bijection may be constrained so that body points associated with the three-dimensional clothing may be mapped to corresponding body points of the mesh of the virtual avatar 1100. In some embodiments, the bijection may be determined, at least in part, from one or more body points of the mesh of the digital three-dimensional model of the article of clothing 1200 and one or more body points of the mesh of the virtual avatar 1100. An axis of a portion of the virtual avatar 1100 may include an axis that passes through the portion of the virtual avatar 1100. For example, a lower arm 1110 of the virtual avatar 1100 may include an axis that runs through and axially aligns with the lower arm 1100. The digital three-dimensional model of the article of clothing 1200 may include a shirt with a sleeve portion that corresponds to the lower arm 1110. The digital three-dimensional model of the shirt 1200 may include an axis that runs through and axially aligns with the sleeve portion. Calculating the mapping with the lowest norm may take into account multiple axes of the virtual avatar 1100 and the multiple corresponding portions of the digital three-dimensional model of the article of clothing 1200. In one embodiment, the norm may include a norm similar to the norm of the Sobolev space $W^{k,p}$ where k=1 and p=2. In some embodiments, k or p may be equal to other values. The Sobolev norm of the mapping or the gradient of the mapping may be minimized. In some embodiments, calculating the mapping may include applying the norm to a Hessian of the bijection. In one embodiment, the bijection may be used to map one or more vertices of the digital three-dimensional model of the article of clothing 1200 onto the virtual avatar 1100, which may fit the digital three-dimensional model of the article of clothing 1200 onto the virtual avatar 1100. In some embodiments, one or more selected line segments between body points may be preserved under the differentiable mapping.

In one embodiment, calculating 910 the lighting data may include calculating the lighting data based on content included in the at least one depth frame. The content may include one or more shadows. The shadows may include a shadow cast by a nose, a body, or other object in the at least one depth frame. A shadow may include a shadow cast on a wall or a floor. A shadow may include shading on a piece of clothing in the at least one depth frame. The lighting data may be based on ray tracing or a Rayleigh scattering model. Calculating the lighting data may include estimating, based on the content of the at least one depth frame, the position, intensity, color, or temperature of one or more light sources. A light source may include a directional lighting, an ambient lighting, or some other light source.

In some embodiments, rendering 912 the digital three-dimensional model of the article of clothing 1200 into the two-dimensional image may include may include adjusting the two-dimensional image. The rendering 912 may include mapping a body point from the digital three-dimensional model of the article of clothing 1200 to a body point on the two-dimensional image in a corresponding location. Similarly, the two-dimensional version of the at least one depth frame may include one or more body points that have been mapped from the one or more body points of the virtual avatar 1100.

In some embodiments, the two-dimensional image may not fit directly onto the two-dimensional version of the at least one depth frame, which may cause the resulting overlay to be inaccurate. In such cases, rendering 912 the digital three-dimensional model of the article of clothing 1200 into the two-dimensional image may include utilizing edge detection on the two-dimensional version of the at least one depth frame.

In one or more embodiments, the edge detection may include executing one or more machine learning models. A machine learning model may include an artificial neural network. An artificial neural network may include a deep belief network, recurrent neural network (RNN), convolutional neural network (CNN), or another type of artificial neural network. A first neural network may use the two-dimensional version of the at least one depth frame, the at least one depth frame, or the virtual avatar 1100 as input. The output of the first neural network may include pose data of the photography subject 802 in the at least one depth frame. The pose data may include a location of one or more joints of the photography subject 802). A second neural network may use the pose data or the two-dimensional version of the at least one depth frame as input. The second neural network may classify each pixel in the two-dimensional version of the at least one depth frame as either belonging to the background or as belonging to the photography subject 802 in the at least one depth frame (which may include a piece of clothing of the photography subject 802).

Figure 13A:
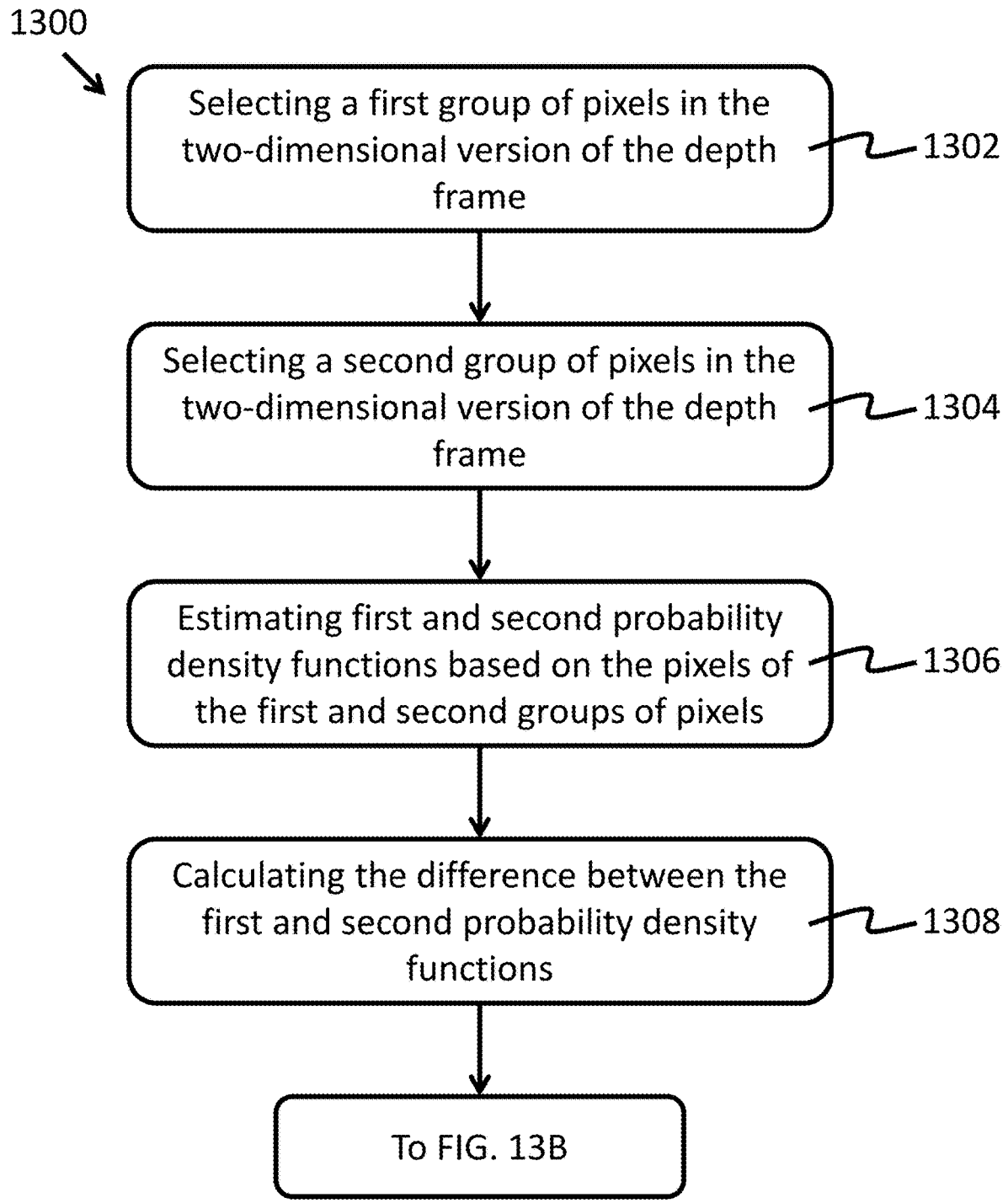
FIG. 13A is a flowchart illustrating one embodiment of a method for edge detection is a system for rendering clothing on a two-dimensional image.
Figure 13B:
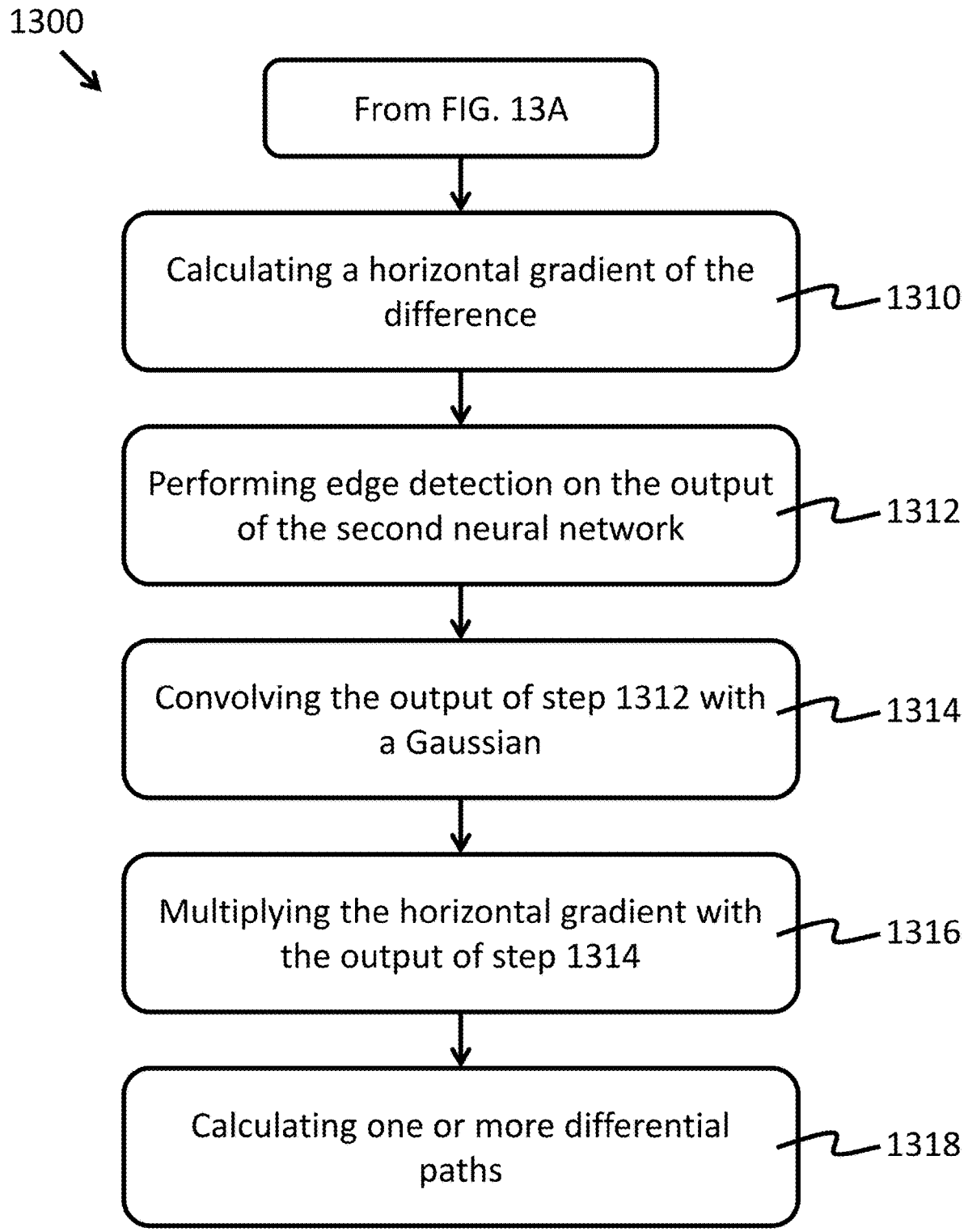
FIG. 13B is a continuation of the flowchart of FIG. 13A.

In one embodiment, the edge detection may include improving the classification output of the second neural network. Improving the classification output may include executing the method 1300, depicted in FIG. 13. The method 1300 may include a computer-implemented method for improving the classification of an image. The method 1300 may include selecting 1302 a first group of pixels in the two-dimensional version of the at least one depth frame. The first group of pixels may include pixels that may be within a predetermined distance from the edge of the photography subject 802 depicted in the two-dimensional version of the at least one depth frame. The method 1300 may include selecting 1304 a second group of pixels in the two-dimensional version of the at least one depth frame. The second group of pixels may include pixels that may be part of the background of the two-dimensional version of the at least one depth frame.

The method 1300 may include estimating 1306 a first probability density function and a second probability density function. The first probability density function may be based on the colors of the pixels of the first group of pixels of step 1302. The second probability density function may be based on the colors of the pixels in the second group of pixels of step 1304. The method 1300 may include calculating 1308 the difference between the second probability density function and the first probability density function. The method 1300 may include calculating 1310 the horizontal gradient of the difference found in step 1308.

The method 1300 may include performing 1312 edge detection on the output of the second neural network. The method 1300 may include convolving 1314 the output from step 1312 with a Gaussian with a predetermined radius. The method 1300 may include multiplying 1316 the horizontal gradient of step 1310 with the output of the convolution resulting from step 1314. The method 1300 may include calculating 1318 one or more differential paths of the form p: [0, 1]→$R^2$ (where R is the set of real numbers) that maximize or minimize the integral $$\int_0^1 w(p(t))dt \text{ or } \int_0^1 w(p(t))\|p'(t)\|dt$$

where w is the resulting function of step 1316, p(t) is the path, p'(t) is the path velocity, and $\|p'(t)\|$ is the Euclidean norm of p'(t). The path, p(t), may include a plurality of pixels in the two-dimensional version of the at least one depth frame that form a portion of the edge of the photography subject 802 in the two-dimensional version of the at least one depth frame. The one or more paths, when considered together, may form an outline of the photography subject 802 in the two-dimensional version of the at least one depth frame.

In some embodiments, finding the path may include scene carving. In some embodiments, the end points of the path or the path velocity may be constrained. In certain embodiments, finding the maximal or minimal path(s) may include using dynamic programming techniques.

In some embodiments, overlaying 914 the two-dimensional image onto the two-dimensional version of the at least one depth frame may include fitting the two-dimensional image onto the edges of the photography subject 802 (which may include the edges found as part of the method 1300). Fitting the two-dimensional image may include using cubic splines and localized Gaussians. The fitting may include a transformation of the form $$f(x, y) = \sum_{i=1}^{n} G_i(x, y)u_i + s(x, y)$$

where x and y are the x and y coordinates of the current pixel of the two-dimensional version of the at least one depth frame, n is the number of pixels, $G_i(x,y)$ is the standard formula for a multivariate Gaussian, $u_i$ is a perturbation vector, and s(x,y) is a piecewise cubic function that maps the two-dimensional image to the two-dimensional version of the depth frame. $G_i(x,y)$ may equal $\exp(-(v-v_i)^T C_i (v-v_i))$ where v and $v_i$ are column vectors of length 2, T is the transpose operator, and $C_i$ is a 2×2 matrix that is a scalar multiple of the inverse of the Gaussian covariance matrix.

The piecewise cubic function, s(x,y), may be generated from a triangular mesh that overlays the two-dimensional image and from a triangular mesh that overlays the two-dimensional version of the at least one depth frame. The two triangular meshes may be topologically identical and the piecewise cubic s(x,y) may act as a graph isomorphism that may map one or more vertices or edges in the first triangular mesh onto corresponding vertices and edges in the second triangular mesh. The piecewise cubic may form a one-to-one correspondence between the edges of both meshes. The mapping may include a mapping between one or more pair of triangles and may include two cubic polynomials. The two cubic polynomials may include a first polynomial for the x value and a second polynomial for the y value. A resulting mapping may include a homeomorphism for one or more pair of triangles. Hermite cubic transformations may map triangles of the first cubic to corresponding triangles of the second cubic. In one embodiment, the piecewise cubic s(x; y) may be constrained to map body points to body points. Determining the piecewise cubic may include minimizing the integral of the Hessian of the cubic together with the sum of the squares of the norms of the differences of the Hessian across one or more edge boundaries. Minimizing the integral of the Hessian may include minimizing the integrated norm of the Hessian. In one embodiment, the piecewise cubic may be differentiable everywhere.

Figure 14A:
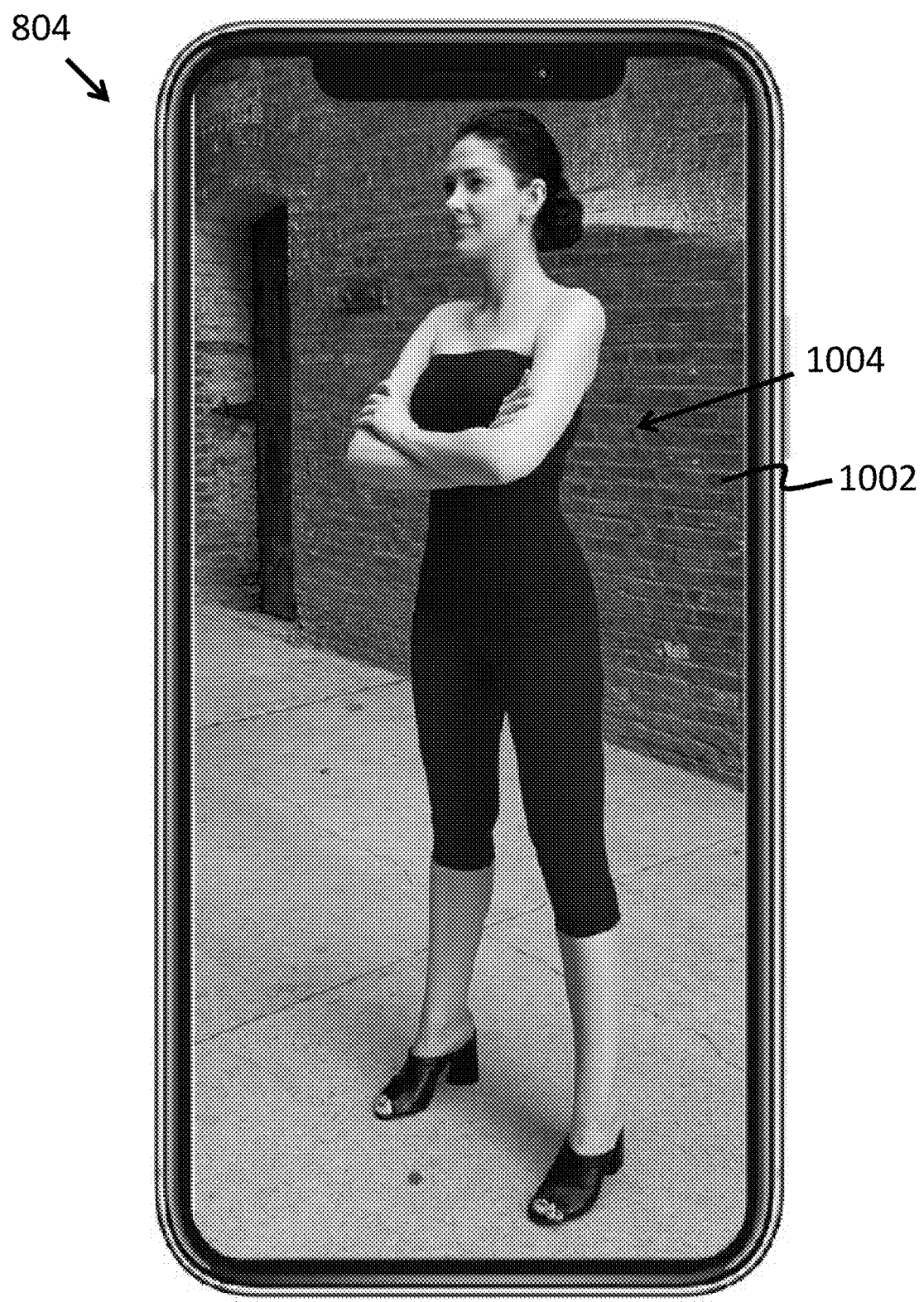
FIG. 14A is a front view illustrating one embodiment of an image-capturing device of a system for rendering clothing on a two-dimensional image.

FIGS. 14A-E depict one embodiment of visual representations of various elements of the systems and methods discussed herein at various steps of the method 900 of FIG. 9. FIG. 14A depicts an image-capturing device 804 that has captured a depth frame of a photography subject 802 (in the example of FIG. 14, a person). The user interface 1004 of the image-capturing device 804 may display a visual representation of the depth frame 1002. The image-capturing device 804 may send the depth frame to the computing device 806 which may receive the depth frame as part of step 902 of the method 900.

Figure 14B:
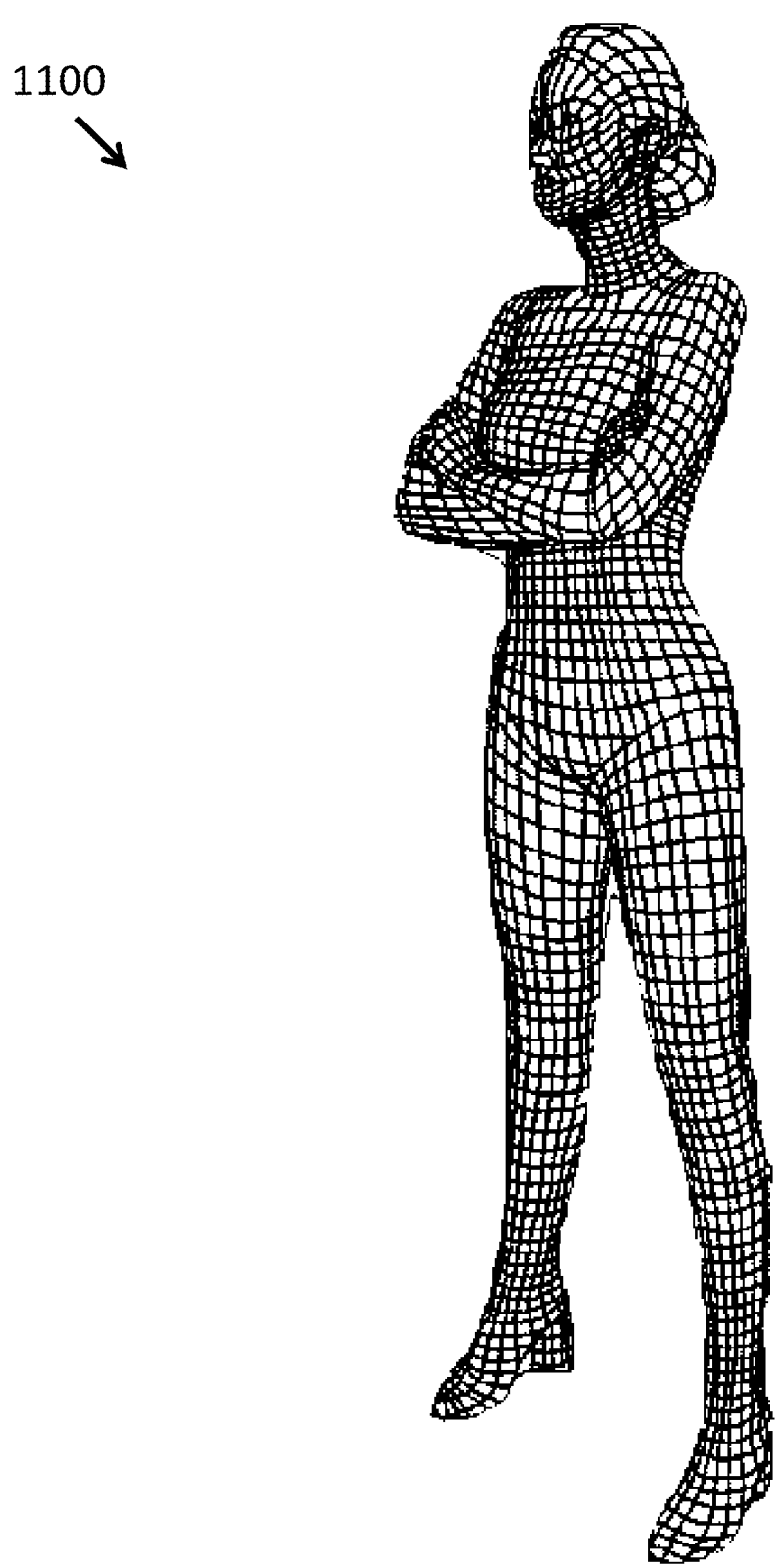
FIG. 14B is a perspective view illustrating one embodiment of a visual representation of a virtual avatar of a system for rendering clothing on a two-dimensional image.
Figure 14C:
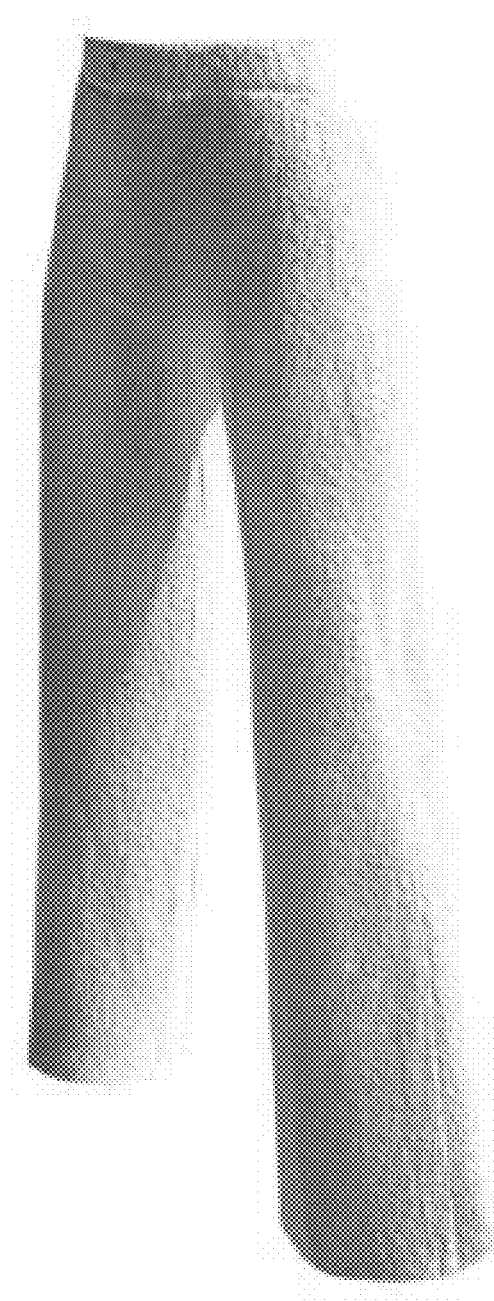
FIG. 14C is a perspective view illustrating one embodiment of a visual representation of a digital three-dimensional model of an article of clothing for a system for rendering clothing on a two-dimensional image.

FIG. 14B depicts one embodiment of a virtual avatar 1100 that may result from the computing device 806 performing step 904 of the method 900. FIG. 14C depicts one embodiment of a digital three-dimensional model of an article of clothing 1200 that the computing device computing device 806 may have received as part of step 906 of the method 900. FIG. 14C may depict the digital three-dimensional model of an article of clothing 1200 after the digital three-dimensional model of an article of clothing 1200 has been translated, zoomed, rotated, or otherwise manipulated as part of step 908 of the method 900. FIG. 14C may depict the digital three-dimensional model of an article of clothing 1200 after the light calculations of the step 910 of the method 900.

Figure 14D:
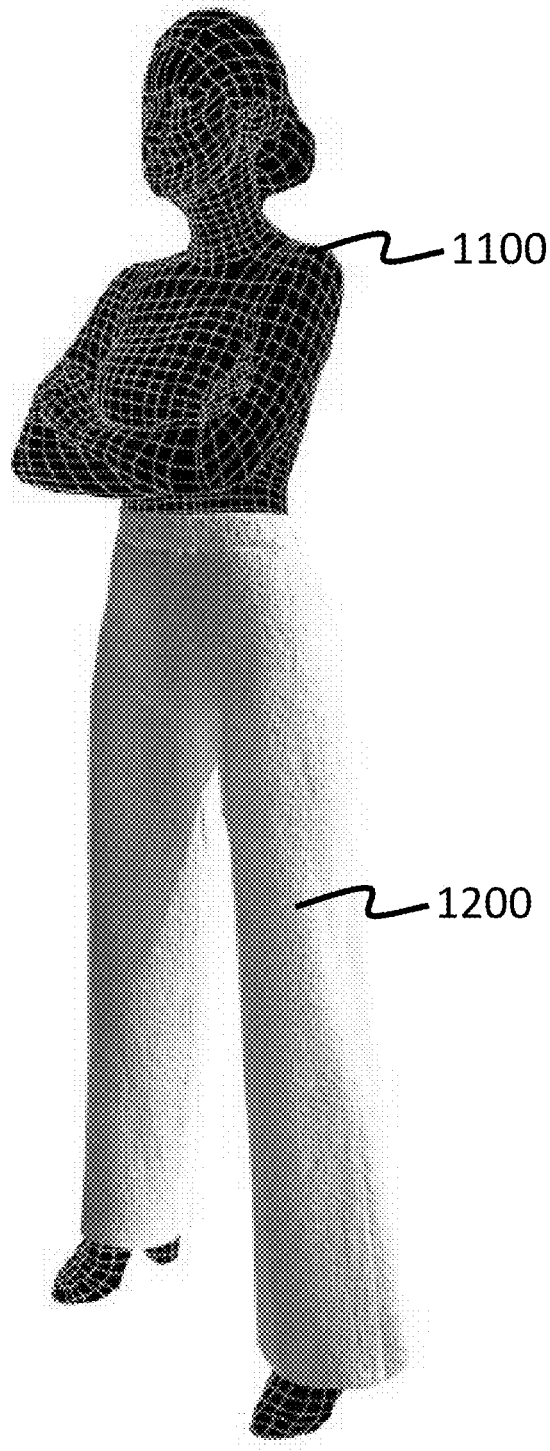
FIG. 14D is a perspective view illustrating one embodiment of the virtual avatar of FIG. 14B overlaid with the digital three-dimensional model of the article of clothing of FIG. 14C.
Figure 14E:
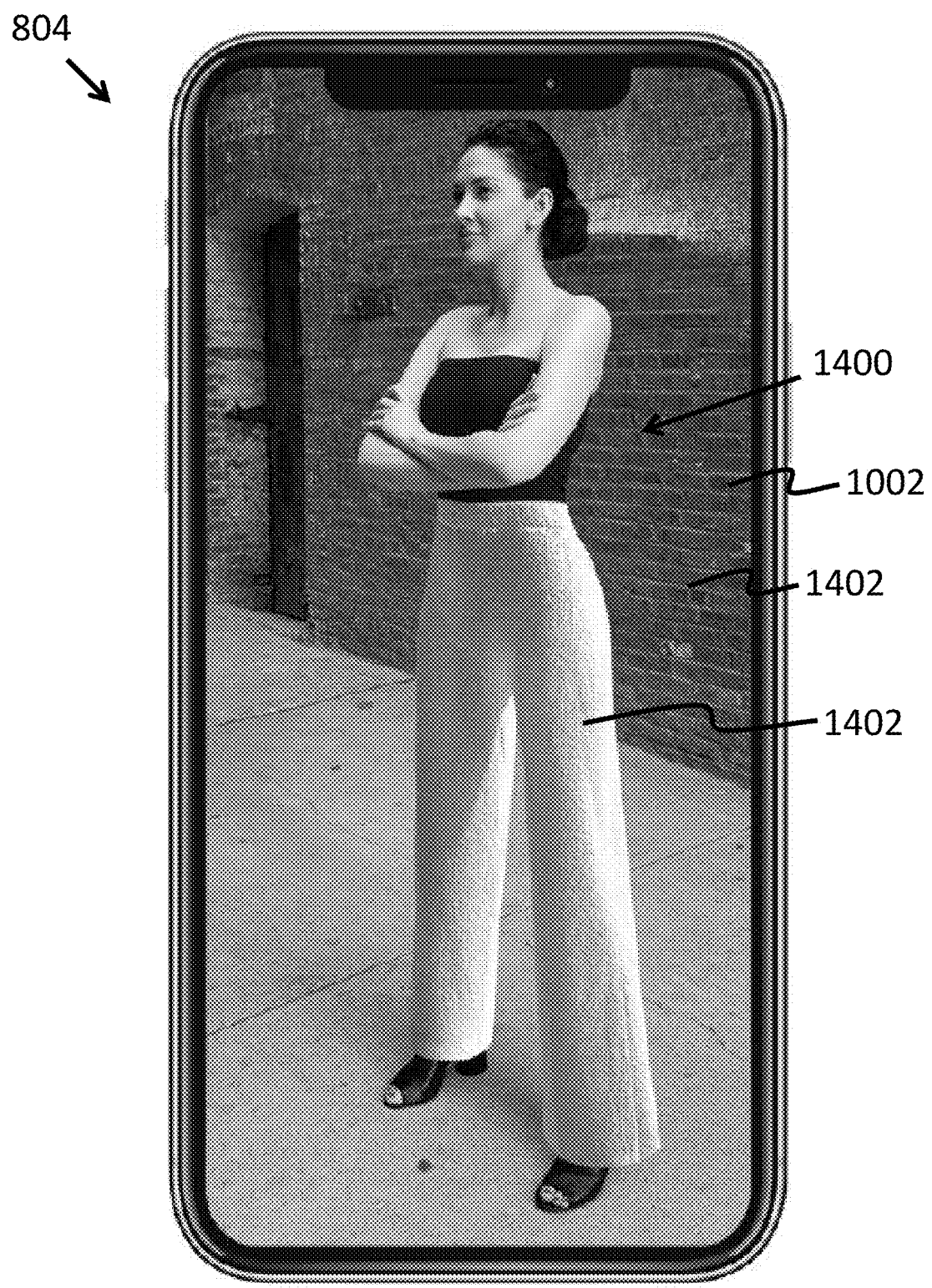
FIG. 14E is a front view illustrating one embodiment of an image-capturing device displaying a two-dimensional image comprising a two-dimensional image of the digital model of the article of clothing of FIG. 14C overlaid onto a two-dimensional version of the at least one depth frame of the FIG. 14A.

FIG. 14D depicts one embodiment of the digital three-dimensional model of an article of clothing 1200 fitted to the virtual avatar 1100 as part of the step 912 of the method 900. FIG. 14E depicts one embodiment of the image-capturing device 804 after it has received the resulting image 1400 resulting from the step 914 of the method 900 and has displayed the resulting image 1400 on the user interface 1004 of the image-capturing device 804. The resulting image may include the two-dimensional image of the article of clothing 1402 overlaid on the two-dimensional version of the at least one depth frame 1404.

As a result of the systems and methods disclosed herein, the computing device 806 may accurately overlay a digital piece of clothing on an image of the photography subject 802 such that the resulting image may include a visual representation of what the photography subject 802 would look like wearing that article of clothing. This is possible even if a digital three-dimensional model of the article of clothing is not posed in the same position as the photography subject 802. The systems and methods allow a user to digitally "try on" an article of clothing and see an accurate representation of what the photography subject 802 would look like.

While the discussion of the systems and method described herein have mainly discussed overlaying an article of clothing on a person, the systems and methods may be applied to other types of photography subjects 802 and other items. For example, the photography subject 802 may include a piece of furniture, and the item overlaid on the piece of furniture may include an upholstery. In another embodiment, the photography subject 802 may include a room of a building, the overlaid item may include furniture, people, or other objects.

While the making and using of various embodiments of the present disclosure are discussed in detail herein, it should be appreciated that the present disclosure provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and may be covered by the claims.

Furthermore, the described features, structures, or characteristics of the disclosure may be combined in any suitable manner in one or more embodiments. In the description contained herein, numerous specific details are provided, such as examples of programming, software, user selections, hardware, hardware circuits, hardware chips, or the like, to provide understanding of embodiments of the disclosure. One skilled in the relevant art will recognize, however, that the disclosure may be practiced without one or more of the specific details, or with other methods, components, materials, and so forth. In other instances, well-known structures, materials, or operations may not be shown or described in detail to avoid obscuring aspects of the disclosure.

These features and advantages of the embodiments will become more fully apparent from the description and appended claims, or may be learned by the practice of embodiments as set forth herein. As will be appreciated by one skilled in the art, aspects of the present disclosure may be embodied as an apparatus, system, method, computer program product, or the like. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer-readable medium(s) having program code embodied thereon.

In some embodiments, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer-readable medium(s).

In some embodiments, a module may include a smart contract hosted on a blockchain. The functionality of the smart contract may be executed by a node (or peer) of the blockchain network. One or more inputs to the smart contract may be read or detected from one or more transactions stored on or referenced by the blockchain. The smart contract may output data based on the execution of the smart contract as one or more transactions to the blockchain. A smart contract may implement one or more methods or algorithms described herein.

The computer program product may include a computer-readable storage medium (or media) having computer-readable program instructions thereon for causing a processor to carry out aspects of the present disclosure. The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium may include a portable computer diskette, a hard disk, a random access memory ("RAM"), a read-only memory ("ROM"), an erasable programmable read-only memory ("EPROM" or Flash memory), a static random access memory ("SRAM"), a hard disk drive ("HDD"), a solid state drive, a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations or block diagrams of methods, apparatuses, systems, algorithms, or computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flow chart diagrams included herein are generally set forth as logical flow chart diagrams. As such, the depicted order and labeled steps are indicative of one embodiment of the presented method. Other steps and methods may be conceived that may be equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Thus, although there have been described particular embodiments of the present invention of new and useful SYSTEM AND METHOD FOR RENDERING CLOTHING ON A TWO-DIMENSIONAL IMAGE, it is not intended that such references be construed as limitations upon the scope of this invention.

What is claimed is:

1. A system for rending clothing on a two-dimensional image, comprising:
    a processor; and
    a computer-readable storage medium storing executable instructions thereon, wherein in response to the processor executing the executable instructions, the processor is configured to
        receive at least one depth frame of a photography subject,
        generate a virtual avatar based on the at least one depth frame, wherein the virtual avatar includes a digital three-dimensional mesh,
        receive a digital three-dimensional model of an article of clothing,
        manipulate the digital three-dimensional model of the article of clothing to fit on the virtual avatar,
        render the digital three-dimensional model of the article of clothing into a two-dimensional image, and
        overlay the two-dimensional image onto a two-dimensional version of the at least one depth frame;
    wherein manipulating the digital three-dimensional model of the article of clothing to fit on the virtual avatar comprises determining a smooth bijection between a three-dimensional space of the model of the article of clothing and a three-dimensional space of the virtual avatar.

2. The system of claim 1, wherein the at least one depth frame comprises a red-green-blue-depth (RGB-D) image.

3. The system of claim 1, wherein the digital three-dimensional mesh comprises a three-dimensional triangulated mesh representing at least a portion of the photography subject.

4. The system of claim 1, wherein the photography subject comprises at least a portion of a human body.

5. The system of claim 4, wherein the processor being configured to generate the virtual avatar comprises inputting, into the virtual avatar, at least one of:
    an angle of a head of the human body relative to a remainder of the human body;
    an angle between an upper arm of the human body and a shoulder of the human body; or
    an angle between the upper arm of the human body and a lower arm of the human body.

6. The system of claim 4, wherein the processor being configured to generate the virtual avatar comprises inputting, into the virtual avatar, at least one of:
    a difference between an orientation of shoulders of the human body and an orientation of hips of the human body;
    a curvature of a spine of the human body;
    an angle between the spine of the human body and an upper leg of the human body; or
    an angle between the upper leg of the human body and a lower leg of the human body.

7. The system of claim 4, wherein the processor being configured to generate the virtual avatar comprises inputting, into the virtual avatar, a length of a bone.

8. The system of claim 4, wherein the processor being configured to generate the virtual avatar comprises modifying a first portion of the virtual avatar relative to a proportion of a second portion of the virtual avatar.

9. A computer-implemented method for rendering clothing on a two-dimensional image, comprising:
    receiving at least one depth frame of a photography subject;
    generating a virtual avatar based on the at least one depth frame, wherein the virtual avatar includes a digital three-dimensional mesh;
    receiving a digital three-dimensional model of an article of clothing;
    manipulating the digital three-dimensional model of the article of clothing to fit on the virtual avatar;
    calculating lighting data based on content included in the at least one depth frame;
    rendering the three-dimensional model of the article of clothing into a two-dimensional image based on the lighting data; and
    overlaying the two-dimensional image onto a two-dimensional version of the at least one depth frame;
    wherein manipulating the digital three-dimensional model of the article of clothing to fit on the virtual avatar comprises determining a smooth bijection between a three-dimensional space of the model of the article of clothing and a three-dimensional space of the virtual avatar.

10. The method of claim 9, wherein:
    receiving the at least one depth frame comprises receiving a plurality of depth frames; and
    the plurality of depth frames include at least one close-up image.

11. The method of claim 9, wherein calculating lighting data comprises at least one of:
    estimating a temperature of a lighting of at the least one depth frame;
    estimating an amount of ambient lighting of at the least one depth frame;
    estimating a direction of the lighting of at the least one depth frame; or
    estimating an intensity of direct lighting of at the least one depth frame.

12. The method of claim 9, wherein rendering the three-dimensional model of the article of clothing into a two-dimensional model comprises edge detection of the at least one depth frame.

13. The method of claim 12, wherein the edge detection comprises executing an artificial neural network on the two-dimensional version of the at least one depth frame.

14. The method of claim 9, further comprising receiving a body measurement.

15. The method of claim 14, wherein the body measurement comprises at least one of:
   a height of the photography subject;
   a waist size of the photography subject; or
   a neck size of the photography subject.

16. The method of claim 9, further comprising overlaying a portion of the depth frame over the two-dimensional image, wherein the portion of the depth frame includes a portion of the photography subject.

17. A system for-rending rendering an item on a two-dimensional image, comprising:
   a processor; and
   a computer-readable storage medium storing executable instructions thereon, wherein in response to the processor executing the executable instructions, the processor is configured to
   receive at least one depth frame of a photography subject,
   generate a virtual avatar based on the at least one depth frame, wherein the virtual avatar includes a digital three-dimensional mesh,
   receive a digital three-dimensional model of an item,
   manipulate the digital three-dimensional model of the item to fit on the virtual avatar,
   calculate lighting data based on content included in the at least one depth frame,
   render the three-dimensional model of the item into a two-dimensional image based on the lighting data, and
   overlay the two-dimensional image onto a two-dimensional version of the at least one depth frame;
   wherein the virtual avatar comprises a plurality of frustums and a plurality of ellipsoids.

18. The system of claim 17, wherein the photography subject comprises a piece of furniture.

* * * * *